United States Patent
Weising et al.

(10) Patent No.: US 11,612,822 B2
(45) Date of Patent: Mar. 28, 2023

(54) METHOD AND SYSTEMS FOR DYNAMIC QUEST GENERATION

(71) Applicant: Sony Interactive Entertainment LLC, San Mateo, CA (US)

(72) Inventors: George Weising, Santa Monica, CA (US); Ernesto Corvi, San Mateo, CA (US); David Thach, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 204 days.

(21) Appl. No.: 17/107,713

(22) Filed: Nov. 30, 2020

(65) Prior Publication Data

US 2022/0168652 A1 Jun. 2, 2022

(51) Int. Cl.
*A63F 13/822* (2014.01)
*A63F 13/847* (2014.01)
*G06N 20/00* (2019.01)

(52) U.S. Cl.
CPC .......... *A63F 13/822* (2014.09); *A63F 13/847* (2014.09); *G06N 20/00* (2019.01); *A63F 2300/5533* (2013.01)

(58) Field of Classification Search
CPC ...... A63F 13/822; A63F 13/847; A63F 13/46; A63F 13/58; A63F 13/67; A63F 13/69; A63F 2300/5533; G06N 20/00
See application file for complete search history.

(56) References Cited

U.S. PATENT DOCUMENTS

| | | |
|---|---|---|
| 2007/0281285 A1 | 12/2007 | Jayaweera |
| 2013/0288757 A1* | 10/2013 | Guthridge ............... A63F 13/67 463/2 |
| 2016/0067611 A1 | 3/2016 | Ware et al. |

(Continued)

OTHER PUBLICATIONS

PCT/US2021/053655, Notification of Transmittal of the International Search Report and the Written Opinion of the International Searching Authority, or the Declaration, PCT/ISA/220, and the International Search Report, PCT/ISA/210, dated Jan. 26, 2022.

(Continued)

*Primary Examiner* — Kevin Y Kim
(74) *Attorney, Agent, or Firm* — Penilla IP, APC

(57) ABSTRACT

Methods and systems are provided for executing a video game for a player. The method includes determining a golden path associated with a gameplay of a player. The golden path includes a plurality of main story quests associated with the golden path. The method includes processing the gameplay to identify player gaming metrics as the player progresses along the golden path. The method includes examining the player gaming metrics to identify a game region along the golden path where the player is determined to need assistance to advance in the video game. The method includes generating a dynamic quest for the player. The dynamic quest is generated with one or more sub-parts to enable acquisition of a reward that is useful for assisting the player to make advancement in said video game along the golden path. The method includes inserting the dynamic quest along the golden path, the inserting presents the dynamic quest to the player and enables said acquisition of said reward.

20 Claims, 17 Drawing Sheets

(56) References Cited

U.S. PATENT DOCUMENTS

2020/0222811 A1 7/2020 Ware et al.
2021/0331074 A1 10/2021 Ware et al.

OTHER PUBLICATIONS

Unknown, "Dynamic game difficulty balancing" XP055877593, Nov. 12, 2020, https://en.wikipedia.org/w/index.php?title=Dynamic_game_difficulty_balancing&oldid=98841086 p. 4, last para, p. 5, first para.

* cited by examiner

Player Metrics Table

| Player ID | Player Gaming Metrics | | | | | Total Score | Dynamic Quests | | |
|---|---|---|---|---|---|---|---|---|---|
| | Level | Ammo | Health | Armor | Currency | | Quest Type | Dynamic Quest Description | Reward |
| Player A | 3 | 81% | 85% | 96% | $12 | 15 | Proximity: Dialog | Interact with bartender | Map unlock |
| Player B | 5 | 75% | 89% | 75% | $68 | 75 | Objective: Purchase | Buy ammo | 5% Ammo |
| Player C | 12 | 38% | 45% | 56% | $202 | 95 | Objective: Fetch | Find armor | 5% Armor |
| Player D | 7 | 66% | 78% | 55% | $105 | 88 | Objective: Defend | Defend civilian | 5 points |
| Player E | 4 | 88% | 82% | 95% | $36 | 65 | Objective: Sabotage | Sabotage NPCs | 5 Points |
| Player F | 17 | 12% | 38% | 10% | $780 | 125 | Objective: Purchase | Purchase health booster | 5% health |
| Player G | 9 | 83% | 91% | 76% | $156 | 42 | Proximity: Dialog | Speak to Governor to obtain new information | Map unlock |
| Player H | 2 | 95% | 98% | 94% | $5 | 3 | Objective: Puzzle | Solve puzzle | 10 Points |
| Player I | 25 | 10% | 15% | 16% | $384 | 205 | Objective: Search | Search for hidden ammo | 10% Ammo |
| Player J | 4 | 96% | 88% | 95% | $9 | 12 | Proximity: Follow | Follow the Field Team Leader | New Weapon: Machine Gun |
| Player K | 13 | 66% | 55% | 64% | $174 | 183 | Objective: Kill | Hunt a deer | 20% health |
| Player L | 6 | 79% | 81% | 89% | $24 | 32 | Objective: Kill | Slay enemy characters | 25 points |
| Player N | 8 | 66% | 71% | 67% | $36 | 73 | Objective: Capture | Seize control over enemy soldiers | 50 points |

FIG. 2A

Dynamic Quest Table — 216

| Dynamic Quest Type | General Description |
|---|---|
| Fetch | Find an item |
| Purchase | Buy an item |
| Kill | Kill a certain character |
| Destroy | Destroy a certain object |
| Sabotage | Set a trap or Sabotage |
| Loot | Loot a body |
| Build | Build an item |
| Messenger | Deliver a message |
| Defend | Protect an item/character/location |
| Capture | Seize control over a location |
| Puzzle | Solve a puzzle/riddle |
| Escape | Escape from a threat |
| Search | Search for an item/character/location |
| Steal | Steal an item |
| Sneak | Sneak past character |
| Dialog | Interact with a character |
| Follow | Follow a character |
| Use | Use an item, ability or skill |

FIG. 2B

Main Story Quest/Table

| Main Story Quest | Main Story Quest Sub-Parts | Quest Type | Quest Pre-Requisite? | Reward |
|---|---|---|---|---|
| Dragon Slayer | Make your way toward Kettle River | Search | No | None |
| | Talk to Fisherman Fred | Search | No | Map Reward |
| | Meet metalworker Matt | Search, Buy | Yes | Sword Reward |
| | Retrieve the Armor | Puzzle | No | Item Reward |
| | Battle Dragon at Agony Hills | Kill | No | Skill/Ability Reward |
| The Hunting Ground | Travel to Fort Funston to find Radio | Travel, Search | No | Item Reward |
| | Tune to enemy Radio Frequency | Use | No | Map Reward |
| | Use enemy radio frequency to track enemy | Search | Yes | Points Reward |
| | Kill enemy | Kill | No | Money Reward |
| Rescue Prisoners | Speak to Sniper Sam | Dialog | No | Skill/Ability Reward |
| | Meet with Team Alpha Team | Dialog | No | Narrative Reward |
| | Buy equipment at Locked 'n Loaded | Search, Buy | Yes | Item/Weapon Reward |
| | Sneak past gatekeeper | Sneak | No | Narrative Reward |
| | Kill guards | Kill | No | Points Reward |
| Brotherhood Fire Support | Listen to military frequency AF109 | Dialogue | No | Map Reward |
| | Proceed to Fire Support location | Travel | Yes | Points Reward |
| | Assist injured soldiers | Defend | Yes | Points Reward |
| | Provide fire support against enemies | Defend | Yes | Points Reward |
| " " | | | | |
| Path to the Mountain | Meet with villagers to obtain map | Travel, Search | No | Item Reward |
| | Use map to begin journey | Travel | Yes | None |
| | Fight off predators | Kill | No | Item Reward |
| | Hunt for food | Kill | No | Item Reward |
| | Talk to wise old man for directions | Dialog | No | Map Reward |
| | Continue toward the mountain peak | Travel | Yes | None |

FIG. 2C

Predefined Dynamic Quest

| Dynamic Quest | Dynamic Quest Sub-Parts | Dynamic Quest Type | Dynamic Quest Pre-Requisite? | Reward |
|---|---|---|---|---|
| Prepare for Dragon | Train with Igor | Dialog, Defend | Yes | Skill/Ability Reward |
| | Bring Naomi her shield | Give | Yes | Narrative Reward |
| | Participate in villagers ritual | Dialog | Yes | Sword |
| Revenge | Talk to Mr. Snowy | Dialog | No | Item Reward |
| | Destroy enemy tanks | Kill | Yes | Enemy defeated |
| | Regroup with soldiers at hidden cave | Dialog | Yes | Narrative Reward |
| Recharging | Follow hunter to shortcut | Follow | No | Skill/Ability Reward |
| | Retrieve ammo and guns | Search | No | Narrative Reward |
| | Search for food | Search | Yes | Item Reward |
| The Shortcut | Kill the Beast | Kill | No | Narrative Reward |
| | Return to main route | Search | Yes | Narrative Reward |
| | Fight wolf | Kill | Yes | Enemy defeated |
| | Gain entry to secret path | Puzzle | Yes | Map Unlock Reward |
| Sabotage Enemy | Begin the hunt | Search, Kill | No | Item Reward |
| | Kill the Hunters | Kill | Yes | Weapons, Ammo |
| | Investigate enemy campground | Search | No | Weapons, Ammo |

FIG. 2D

Reward Type Table

| Reward ID | Reward Type |
|---|---|
| R1 | Narrative Reward |
| R2 | Item/Weapon Reward |
| R3 | Map Unlock Reward |
| R4 | Skill/Ability Reward |
| R5 | Crafting Recipe |
| R6 | Feature Unlock |
| R7 | Quest Reward |
| R8 | Money Reward |
| R9 | Points Reward |

FIG. 2E

Dynamic Quest Interface

Saved Dynamic Quests

| Quest ID | Dynamic Quest Type | Dynamic Quest Description | Reward |
|---|---|---|---|
| DQ 1 | Proximity: Dialog | Interact with bartender | Map unlock |
| DQ 2 | Objective: Purchase | Buy ammo | 5% Ammo |
| DQ 3 | Objective: Fetch | Find armor | 5% Armor |
| DQ 4 | Objective: Defend | Defend civilian | 5 points |
| DQ 5 | Objective: Sabotage | Sabotage NPC 5 | 5 Points |
| DQ 6 | Objective: Purchase | Purchase health booster | 5% health |
| DQ 7 | Proximity: Dialog | Speak to Governor to obtain new information | Map unlock |
| DQ 8 | Objective: Puzzle | Solve puzzle | 10 Points |
| DQ 9 | Objective: Search | Search for hidden ammo | 10% Ammo |
| DQ 10 | Proximity: Follow | Follow the Field Team Leader | New Weapon: Machine Gun |
| ... | | | |
| DQ N | Objective: N | Slay enemy characters | 25 points |

Relevant Dynamic Quests

| Quest ID | Dynamic Quest Type | Dynamic Quest Description | Reward |
|---|---|---|---|
| DQ 2 | Objective: Purchase | Buy ammo | 5% Ammo |
| DQ 3 | Objective: Fetch | Find armor | 5% Armor |
| DQ 9 | Objective: Search | Search for hidden ammo | 10% Ammo |
| DQ 10 | Proximity: Follow | Follow the Field Team Leader | New Weapon: Machine Gun |

FIG. 4

METHOD AND SYSTEMS FOR DYNAMIC QUEST GENERATION

BACKGROUND

1. Field of the Disclosure

The present disclosure relates generally to executing a video game, and more particularly to methods and systems for executing a video game to provide a player with a customized gaming experience.

2. Description of the Related Art

The video game industry has seen many changes over the years. In particular, the video game industry has been trying to find ways to enhance a player's engagement level in video games in order to increase retention levels and increase video game revenue. To this end, developers have been seeking ways to develop sophisticated operations that would enhance the gaming experience of a player who may become bored, frustrated, or uninterested in their gameplay.

A growing trend in in the video game industry is to improve and develop unique ways that will enhance the experience of players playing a video game and make the video game more interesting. For example, when a novice level player is playing a role-playing game (RPG) video game, they may become lost in the game environment and confused on how to progress in the gameplay. Unfortunately, this may lead to the player becoming frustrated with their gameplay and not wanting continue playing the video game. In another example, an advanced level user may become bored with their gameplay if the game scenes in the video game are predictable and no longer provide the player with a sense of uniqueness and relevance. As a result, player engagement in video games may decrease which may lead to players playing video games less frequently.

It is in this context that implementations of the disclosure arise.

SUMMARY

Implementations of the present disclosure include methods, systems, and devices relating to executing a video game for a player. In some embodiments, methods are disclosed that provides a customized gaming experience for a player, where dynamic quests are generated and inserted along a game's main story arc (or golden path) associated with a gameplay of the player. For example, during gameplay of a player, the player may be in a game environment and progressing along a golden path that is associated with the gameplay of the player. Instead of limiting the player to main story quests that are associated with the golden path, the methods disclosed herein outline ways of generating and inserting (e.g., surfacing) dynamic quests along the golden path so that the golden path is supplemented with dynamic quests so that a unique gaming experience is provided to the player.

Thus, during the gameplay of a player, as the player moves along the golden path and interacts with various aspects in the game environment, one or more dynamic quests can be presented along the golden path which can enable the player to progress forward in the video game, attain a reward, or expose the player to an aspect of the video game that may be more interesting to the player. In some embodiments, the gameplay of the player may be processed to identify gaming metrics of the player. In one embodiment, using the gaming metrics of the player, dynamic quests can be generated and inserted along the golden path in game regions where the player is determined to need assistance to advance in the video game.

In one embodiment, a method for executing a video game is provided. The method includes determining a golden path associated with a gameplay of a player. The golden path includes a plurality of main story quests associated with the golden path. The method includes processing the gameplay to identify player gaming metrics as the player progresses along the golden path. The method includes examining the player gaming metrics to identify a game region along the golden path where the player is determined to need assistance to advance in the video game. The method includes generating a dynamic quest for the player. The dynamic quest is generated with one or more sub-parts to enable acquisition of a reward that is useful for assisting the player to make advancement in said video game along the golden path. The method includes inserting the dynamic quest along the golden path, the inserting presents the dynamic quest to the player and enables said acquisition of said reward. In this way, a video game is executed for a player which can provide the player with a customized gaming experience and aid player progress in the video game.

In another embodiment, a method for executing a video game for a plurality of players is provided. The method includes determining a plurality of golden paths associated with gameplay of each of the plurality of players. The plurality of golden paths includes a plurality of main story quests associated with the plurality of golden paths. The method includes processing the gameplay to identify player gaming metrics for the plurality of players as the plurality of players progresses along the plurality of golden paths associated with each of the plurality of players. The method includes examining the player gaming metrics for each of the plurality of players to identify game regions along the plurality of golden paths where the plurality of players are determined to need assistance advancing in the video game. The method includes generating a dynamic quest for each of the plurality of players. The dynamic quest is generated with one or more sub-parts to enable acquisition of a reward that is useful for assisting the plurality of players advance in said video game. The method includes presenting the dynamic quest along the plurality of golden paths of each of the plurality of players. The presenting presents the dynamic quest to the plurality of players and enables said acquisition of said reward.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 2A illustrates an embodiment of a player metrics table illustrating player gaming metrics that are tracked and processed for a plurality of players playing a video game and the corresponding dynamic quest that are generated based on the gaming metrics of each player, in accordance with an implementation of the disclosure.

FIG. 2B illustrates an embodiment of a dynamic quest table showing a listing of dynamic quest types and a general description of the dynamic quest type, in accordance with an implementation of the disclosure.

FIG. 2C illustrates an embodiment of a main story quest table illustrating various main story quests and its corresponding main story quest sub-parts, in accordance with an implementation of the disclosure.

FIG. 2D illustrates an embodiment of a dynamic quest table illustrating predefined dynamic quests that can be accessed to select a dynamic quest for insertion along a golden path, in accordance with an implementation of the disclosure.

FIG. 2E illustrates an embodiment of a reward type table illustrating the reward types that a player may acquire for successfully completing a dynamic quest, in accordance with an implementation of the disclosure.

FIG. 4 illustrates an embodiment of a dynamic quest interface of a player that incudes saved dynamic quests and relevant dynamic quests that may be useful to the player, in accordance with an implementation of the disclosure.

DETAILED DESCRIPTION

Figure 1A:
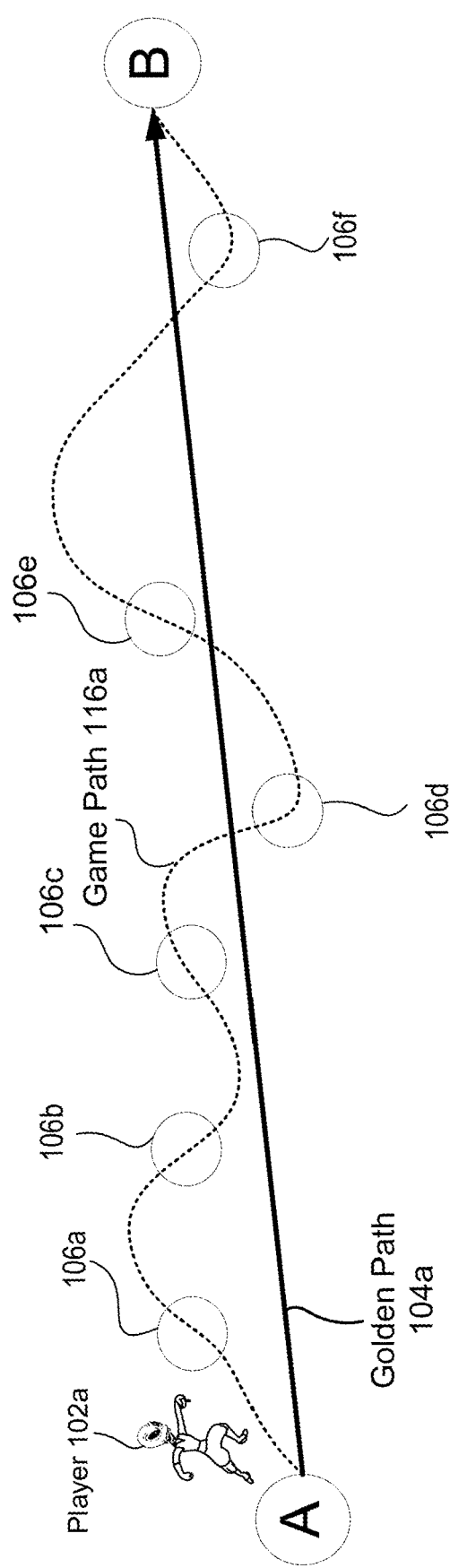
FIG. 1A illustrates an embodiment of a unique gaming experience with dynamically generated dynamic quests along a golden path that a player may use to navigate from point A to point B in a game environment, in accordance with an implementation of the disclosure.

The following implementations of the present disclosure provide methods, systems, and devices for executing a video game for a player. In particular, during gameplay of a player, as the player progresses along a golden path in the video game, the player may encounter a fixed sequence of challenges, e.g., main story quests. For example, a main story quest may include challenges and objectives associated with the video game, e.g., slay the dragon, save priciness Leah, rescue prisoners, climb Mt. Everest, etc. In one embodiment, a golden path associated with the gameplay of player may include a set number of pre-defined main story quests and corresponding main story quest sub-parts. In other words, when a player navigates along a particular golden path in a video game, other players who navigates along the golden path may encounter the same or similar main story quests. Accordingly, in order to enhance the experience of players playing a video game and to make the video game more interesting to the player, one or more dynamic quests with corresponding dynamic quest sub-parts can be generated and dynamically inserted or presented to the player along the golden path of the player to create a customized gaming experience.

In one embodiment, the dynamic surfacing of unique quests and quest combinations provide each player with a unique gaming experience so that the player's interest is maintained and/or enhanced. For example, while progressing along a golden path where a player is trying to reach a game scene to fight a "boss character," the system may generate and insert a dynamic quest along the golden path before reaching the "boss character" to enable acquisition of a reward that would be useful for fighting the "boss character," e.g., sword, shield, specialized skill or ability, etc. Generally, the methods described herein provides a way for dynamic quests to be generated and inserted/presented along the golden path of the gameplay of a player so that the player is encouraged to continue with their gameplay and to further enhance the gaming experience of the player.

As used herein, the term "golden path" should be broadly understood to refer to a path in a game environment of a video game that may lead a player to a desired location in the game environment such as a next level, stage, area, location, phase, mission, etc. In one embodiment, each game session associated with the gameplay of a player includes a "golden path." For purposes of clarity, references to "golden path" should be taken in the general broad sense where the "golden path" can lead a player to a desired location in the game environment to meet an objective of the player, or in accordance with other specific examples described herein.

Additionally, the term "main story quest" should be broadly understood to refer to any task, event, process, action, goal, move, or mission in a video game that a player may complete. In some cases, completion of any of the above may result in a reward. In one embodiment, "main story quests" are associated with the golden path of a player. The term "dynamic quest" should be broadly understood to refer to any task, event, process, action, goal, move, or mission in a video game that is dynamically customized for a player and inserted or presented during progression along the golden path of the player to create a customized gaming experience for the player. Generally, a "dynamic quest" are bespoke quests tied to the player journey and are related to non-player character (NPC's) in the video game. In one embodiment, a "dynamic quest" is drawn from a set of available dynamic quests based on the current condition (level, gear, position in the story, etc.) of the player.

By way of example, in one embodiment, a method is disclosed that enables executing a video game for a player. The method includes determining a golden path associated with a gameplay of a player. In one example, the golden path may include a plurality of main story quests associated with the golden path. In one embodiment, the method may further include processing the gameplay to identify player gaming metrics as the player progresses along the golden path. In another embodiment, the method may include examining the player gaming metrics to identify a game region along the golden path where the player is determined to need assistance to advance in the video game.

In some embodiments, the method includes generating a dynamic quest for the player. In one example, the dynamic quest is generated with one or more sub-parts to enable acquisition of a reward that is useful for assisting the player to make advancement in said video game along the golden path. In another embodiment, the method includes inserting the dynamic quest along the golden path. In one example, the inserting presents the dynamic quest to the player and enables said acquisition of said reward. It will be obvious, however, to one skilled in the art that the present disclosure may be practiced without some or all of the specific details presently described. In other instances, well known process operations have not been described in detail in order not to unnecessarily obscure the present disclosure.

In one embodiment, a method is disclosed for executing a video game for a player and providing the player with a unique gaming experience with dynamically generated dynamic quests along a golden path. In some embodiments, during the gameplay of the player, a plurality of dynamic quests can be generated based on the gaming metrics of the player and inserted along a golden path of the player as the player progresses along the golden path.

In accordance with another embodiment, a system is disclosed for executing a video game for a plurality of players playing a video game such as an online multiplayer video game and generating dynamic quests that influence the plurality of players to join one another at an in-game meetup during their respective gameplay. During the gameplay of each player, each of the plurality of players may have a golden path associated with their gameplay. In one embodiment, dynamic paths may be generated and customized for each player and inserted along the golden path of each player to create a customized gaming experience. In some embodiments, the dynamic quests associated with each player may cause the plurality of players to join and play in a same game space area (e.g., in-game meetup). In one example, at the in-game meetup, the plurality of players may interact with one another and work together to accomplish a specific task or game objective (e.g., fight an enemy, search for a character, solve a puzzle, etc.).

In accordance with another embodiment, a system is disclosed for executing a video game for a plurality of players and generating dynamic quests that influence certain players to join together at a co-op game space. In one embodiment, a co-op game space may allow players of different skillset, experience, and levels to join together and engage with one another in the same game space. In one embodiment, an advanced player with more experience and skills may be playing a video game at a more advanced level, and less experience players may be playing the video game at a lower level. In some embodiments, the game environment of the advanced player may include a co-op space that may facilitate the gameplay of the advanced player and less experienced players. In one embodiment, the less experienced players may access the co-op space within the game environment of the advanced player to experience the game scenes and activities within the co-op space. After engaging with the advanced player in the co-cop space, the less experience players may leave the co-op space and continue along their respective golden paths.

With the above overview in mind, the following provides several example figures to facilitate understanding of the example embodiments.

FIG. 1A illustrates an embodiment of a unique gaming experience with dynamically generated dynamic quests 106a-106f along a golden path 104a that player 102a may use to navigate from point A to point B in a game environment of a video game. In one embodiment, the golden path 104a is a path that can lead a player from an initial point in the video game (e.g., point A) to a desired point in the video game (e.g., point B). In some embodiments, the golden path 104a can be straight path or be any non-linear path that can lead a player from point A to point B in the video game. As illustrated, FIG. 1A shows a golden path 104a which includes plurality of dynamic quests 106a-106f that are generated and inserted along the golden path 104a as player 102a progresses along the golden path 104a. The golden path 104a is shown as a straight line, but it can take on many number of directions that enable progression to point B.

In one embodiment, a unique dynamic quest 106 can be generated and customized for each player 102 and be generated based on the player's gaming metrics (e.g., player experience, instant game conditions, player game state, etc.). In one embodiment, each dynamic quest 106 may vary and be associated with a specific objective or task in the video game, e.g., find an item, kill a certain character, sneak past a character, solve a puzzle, etc. In some embodiments, the dynamic quest 106 is generated with one or more sub-parts to enable acquisition of a reward that is useful for assisting the player 102 advance in the video game along the golden path 104. To illustrate the customized gaming experience for player 102a, in one example, as illustrated in FIG. 1A, the golden path 104a may be a path in a video game that leads player 102a through a series of main story quests (not shown) and dynamic quests 106 where the objective of the player 102a is to fight a "dragon character" in order to advance onto the next level of the video game.

In one embodiment, the player 102a may begin their gameplay at point A along the golden path 104a. As the player 102a moves along the golden path 104a in a direction towards point B, the gaming metrics of the player 102a is continuously processed and monitored. In some embodiments, the player 102*a* may encounter a plurality of main story quests (not shown) associated with the golden path 104*a*. As shown along the golden path 104*a*, the system may generate and insert dynamic quest 106*a* along the path 104*a* to present player 102*a* with a dynamic quest that involves "talking to Fisherman Fred at Kettle River" in order to obtain a map that leads the location of the "dragon character" (e.g., Point B). In some embodiments, the player 102*a* may take on the dynamic quests 106 that are presented to the player 102*a* or ignore it and continue to move along the golden path 104*a*.

As the player 102*a* continues to move along the golden path 104*a*, the system may generate and insert additional dynamic quests 106*b*-106*f* along the golden path 104*a*. In one example, player 102*a* may be presented with dynamic quest 106*b* which involves "locating Metal Worker Mike" in order to purchase a sword. After purchasing the sword, player 102*a* may continue to progress along the golden path 104*a* and may encounter dynamic quest 106*c* which involves "solving a puzzle at the waterfall" in order to obtain an upgraded armor. After acquiring the sword and the upgraded armor, the player 102*a* may encounter dynamic quest 106*d* which involves "training with Villager Viho" to learn how to use the sword and armor. After the training session with Villager Viho, player 102*a* may continue to progress along the golden path 104*a* and may encounter dynamic quest 106*e* which involves "following Villager Vipponah" in order to get back on the correct path. Further, the player 102*a* may encounter dynamic quest 106*f* which involves "building a shelter" in order to rest and gain strength before fighting the dragon character at sunrise.

Accordingly, as the player 102*a* progresses along the golden path 104*a*, the system examines the player gaming metrics and identifies game regions along the golden path 104*a* where the player 102*a* is determined to need assistance to advance in the video game. In the illustrated example, dynamic quests 106*a*-106*f* were generated and inserted in game regions where the player 102*a* needed help preparing for a fight against the dragon character, e.g., obtaining map, sword, armor, training, etc. As further illustrated in FIG. 1A, game path 116*a* illustrates a footprint of the path taken by player 102*a* when the player 102*a* navigated from Point A to Point B in the video game.

Figure 1B:
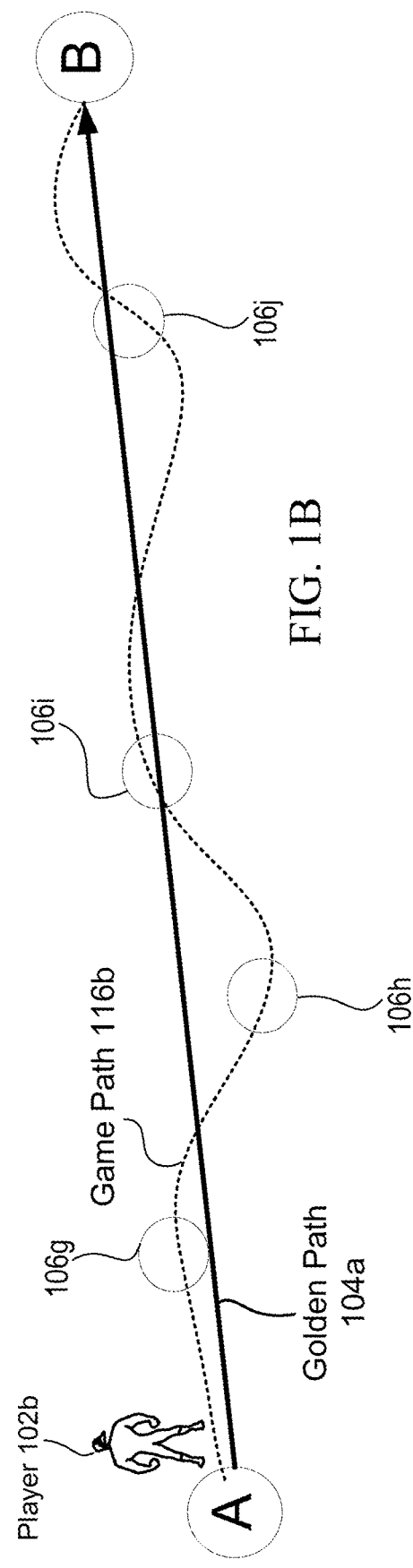
FIG. 1B illustrates an embodiment of the golden path shown in FIG. 1A illustrating a plurality of dynamic quests that are generated and inserted along the golden path to create a customized gaming experience for the player, in accordance with an implementation of the disclosure.

FIG. 1B illustrates an embodiment of the golden path 104*a* shown in FIG. 1A illustrating a plurality of dynamic quests 106*g*-106*j* that are generated and inserted along the golden path 104*a* to create a customized gaming experience for player 102*b*. As noted above, during the gameplay of a player 102, the gaming metrics of the player 102 is continuously processed and monitored to determine game regions along the golden path 104 where the player 102 may be in need of assistance. Accordingly, dynamic quests 106 may be generated and inserted at specific regions along the golden path 104 to enable acquisition of a reward to help the player 102 advance in the video game or to make the video game more engaging to the player 102. As illustrated in FIG. 1B, player 102*b* is shown beginning their gameplay at point A and navigating along the golden path 104*a* in a direction towards point B.

As the player 102*b* progresses along the golden path 104*a*, the system may generate and insert dynamic quests 106*g*-106*i* along the golden path 104*a*. The dynamic quests 106 can be customized for each player 102 and be based on the player's gaming metrics. For example, although player 102*b* navigates along the same golden path (e.g., 104*a*) and encounters the same main story quests as player 102*a* in FIG. 1A, the dynamic quests 106 that are generated for player 102*a* and 102*b* may differ and depend on the respective gaming metrics of each player.

In one example, dynamic quest 106*g* may be a dynamic quest that involves "training with Igor" to learn how to fight the dragon character. Dynamic quest 106*h* may involve "participating in spiritual ritual" to mentally prepare for the fight against the dragon character. Dynamic quest 106*i* may involve "building a fireproof shield" that can be used to defend against the dragon character." Dynamic quest 106*j* may involve "climbing a mountain" to reach the cave of the dragon character. Accordingly, in the illustrated example, dynamic quests 106*g*-106*i* are generated and inserted in game regions of the golden path 104*a* where the player 102*b* is in need of assistance advancing in the video game. As further illustrated in FIG. 1B, game path 116*b* illustrates a footprint of the path taken by player 102*b* when the player 102*b* navigated from Point A to Point B in the video game.

Figure 1C:
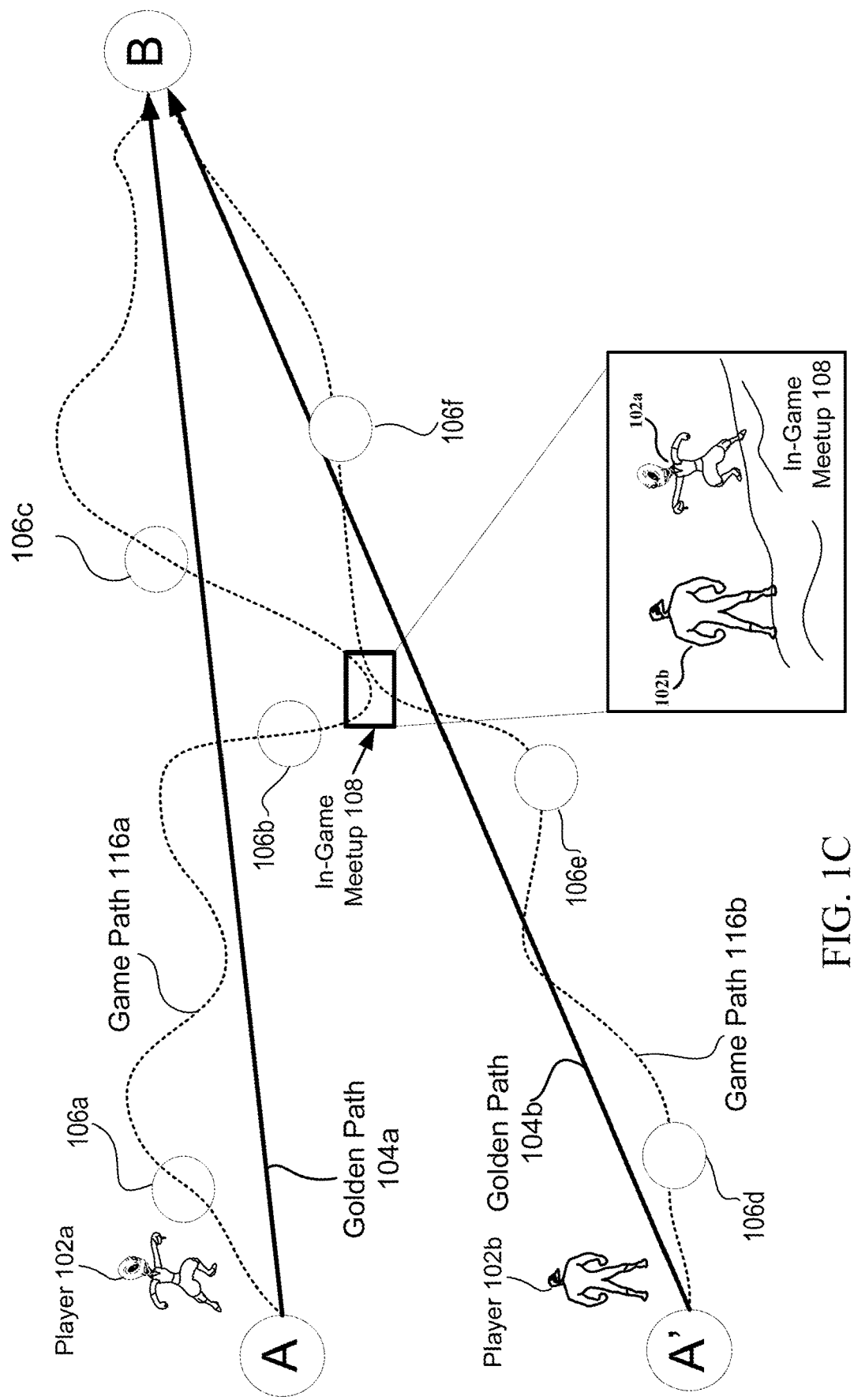
FIG. 1C illustrates an embodiment of a unique gaming experience generated for a plurality of players that includes dynamically generated dynamic quests along each player's respective golden path and an in-game meetup space, in accordance with an implementation of the disclosure.

FIG. 1C illustrates an embodiment of a unique gaming experience generated for players 102*a* and 102*b* that includes dynamically generated dynamic quests 106*a*-106*f* along each player's respective golden path 104 and an in-game meetup space 108. In one embodiment, players 102*a*-102*b* may be approximately the same level and playing a video game such as an online multiplayer video game. The golden path 104 of each player may begin at different locations (e.g., point A, point A') and lead each player to the same location (e.g., point B) in the game environment. In some embodiments, the golden path 104 of each player 102 may include dynamic quests 106 which can influence each player to move along their respective golden paths to join at an in-game meetup space 108 where the players can engage in an in-game activity with each another.

To illustrate the customized gaming experience for player 102*a* and player 102*b*, in one example, as illustrated in FIG. 1C, golden paths 104*a*-104*b* may begin at point A and point A' for player 102*a* and player 102*b*, respectively. The golden paths 104*a*-104*b* may be a path in a video game that leads players 102*a*-102*b* through a series of main story quests (not shown) and dynamic quests 106 where the objective is to fight enemy soldiers and to rescue prisoners and to lead the prisoners to safety zone (e.g., Point B). In one example, player 102*a* may begin their gameplay at point A. As the player 102*a* moves along the golden path 104*a* in a direction towards point B, the gaming metrics of the player 102*a* is continuously processed. Using the gaming metrics of player 102*a*, the system generates and inserts dynamic quest 106*a* along golden path 104*a* to present player 102*a* with a dynamic quest that involves "finding a hidden treasure box" in order to obtain an assault rifle. After engaging with dynamic quest 106*a*, player 102*a* may continue along the golden path 104*a* towards points B. In some embodiments, player 102*a* may encounter and engage with a plurality of main story quests (not shown) as the player 102*a* progresses along the golden path 104*a*.

In some embodiments, as the player 102*a* continues to move along the golden path 104*a* after engaging with dynamic quest 106*a*, the system may determine that the player 102*a* is off track and is moving in the wrong direction. Accordingly, the system may spawn the dynamic quest 106*b* and insert it proximate to the golden path 104*a* to entice the player 102*b* to make their way back on the correct path. In one embodiment, dynamic quest 106*b* may involve "fighting an enemy solider" and obtaining information where the prisoners may be located. After engaging with dynamic quest 106*b*, the dynamic quest 106*b* may cause the player 102*a* to enter the in-game meetup space 108 where player 102*b* may be located. In other embodiments, the system may spawn the dynamic quest 106 at a particular time during the gameplay when the player is determined to need the reward associated with the dynamic quest.

As further illustrated in FIG. 1C, player 102b may begin their gameplay at point A' along golden path 104b which leads to point B. As the player 102b moves along the golden path 104b, the player 102b may be presented with dynamic quest 106d which involves a task of "killing an enemy" and obtaining night vision goggles. After engaging with dynamic quest 106d, the player 102b can use the night vision goggles to help advance forward along the golden path 104b. Along the golden path 104b, the player 102b is presented with dynamic quest 106e which involves a task of "following a game character to the top of a tree" in order to get a better viewpoint of the golden path 104b. While engaging with dynamic quest 106e, the dynamic quest 106e may cause the player 102b to visually discover the in-game meetup space 108 which nudges player 102b in a direction toward the in-game meetup space 108.

As player 102a and player 102b progresses along their respective golden paths, their corresponding dynamic quests 106 may lead each player to the in-game meetup space 108. In some embodiments, at the in-game meetup space 108, the players may engage with each other to perform various objectives and tasks such battling together, working together to accomplish a task, strategizing to accomplish an objective, etc. As further illustrated in FIG. 1C, player 102a and player 102b are shown meeting together at the in-game meetup space 108. In one example, player 102a and player 102b are shown interacting with each other to strategize a plan to rescue prisoners along their respective golden paths and to lead the prisoners to the safety zone (e.g., Point B). After departing from the in-game meetup space 108, player 102a and player 102b may continue along their respective golden paths and may encounter main story quests and dynamic quests. As further illustrated in FIG. 1C, player 102a and player 102b are presented with dynamic quests 106c and 106f, respectively, which involves "rescuing prisoners" and leading them to the safety zone at point B.

Figure 1D:
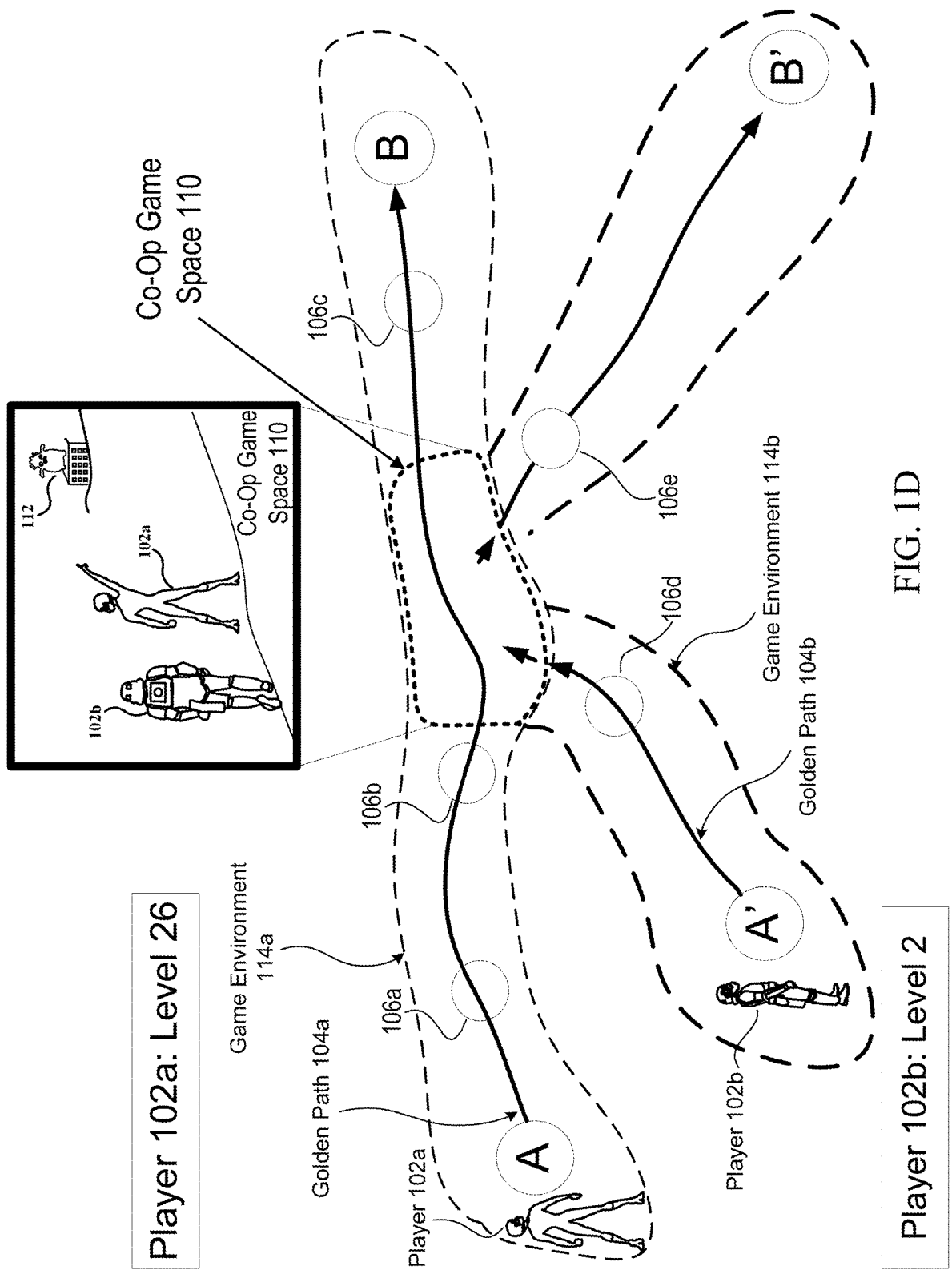
FIG. 1D illustrates an embodiment of a unique gaming experience for a plurality of players that includes dynamically generated dynamic quests and a co-op game space where players of different experiences and different levels can join together and engage with one another in the same game space, in accordance with an implementation of the disclosure.

FIG. 1D illustrates an embodiment of a unique gaming experience for players 102a-102b that includes dynamically generated dynamic quests 106a-106e and a co-op game space 110 where players of different experiences and different levels can join together and engage with one another in the same game space. In some embodiments, a plurality of players 102 may be playing a video game and each of the players may be playing in different levels since the gaming experience and the skills of each of the players may vary. In one embodiment, each player 102 may be playing in a game environment 114 that is unique for each player which may include main story quests (not shown) and dynamically generated dynamic quests 106 along the respective golden path 104 of each player 102.

In some embodiments, the dynamic quests 106 are generated based on the gaming metrics of the player. For example, a player 102 that has more gaming experience and more advance skills in the video game may be presented with dynamic quests 106 that are more challenging compared to a novice player that is new to the video game. In other embodiments, the dynamic quests 106 can be generated to influence a player to join up or meet up at a particular game space such as the co-op game space 110. In some embodiments, the co-op game space 110 may be located within a game environment 114 of a particular player which can be accessible by other players if access is granted. The co-op game space 110 can be shared with players who do not have the same co-op game space 110 within their respective game environment 114. For example, the co-op game space 110 may be located in a game environment 114 of an advanced player. The advanced player may grant a novice player access to the co-op game space 110 so that the novice player can experience the gameplay in the co-op game space 110 that includes advanced gaming scenes.

As shown in FIG. 1D, player 102a is playing in a game environment 114a that is at level 26. Player 102a may begin their gameplay at point A along golden path 104a which leads the player 102a to point B. The golden path 104a may include a plurality of main story quests (not shown) and dynamic quests 102a-102c that are generated based on the gaming metrics of player 102a. Since player 102a is playing in a game environment 114a that is at level 26, the dynamic quests 102a-102c and its sub-parts may be of the same or similar level so that the gameplay of player 102a remains challenging and keeps the player 102a engaged. The game environment 114a also may also include the co-op game space 110 that includes gaming scenes that player 102a and other players may engage with.

As further illustrated in FIG. 1D, player 102b is shown playing in a game environment 114b that is at level 2. Player 102b may begin their gameplay at point A' along golden path 104b which leads the player 102b to point B'. The golden path 104b may include a plurality of main story quests (not shown) and dynamic quests 102d-102e that are generated based on the gaming metrics of player 102b. In one example, dynamic quest 106d is generated to influence player 102b to meet up and join player 102a at the co-op game space 110 so that player 102b can play at a more advanced level for a period of time. For example, dynamic quest 106d may involve a training session to learn how to use a sniper rifle. After successfully engaging with dynamic quest 106d, player 102a may provide player 102b with access to the co-op game space 110 so that player 102b can assist player 102a in a game scene that involves shooting and killing character 112. Once player 102b interacts with player 102a and helps defeat character 112, player 102b can leave the co-op game space 110 and return to game environment 114b and continue along golden path 104b toward point B'.

FIG. 2A illustrates an embodiment of a player metrics table 202 illustrating player gaming metrics 204 that are tracked and processed for a plurality of players 102 playing a video game and the corresponding dynamic quest 106 that are generated based on the gaming metrics 204 of each player. In one embodiment, the player gaming metrics 204 may include game play conditions that are tracked while the player is playing the video game. In one example, the game play conditions may relate to a combination of game conditions (e.g., what is occurring in the gameplay) and player interactivity conditions (e.g., what player is doing in the gameplay). As shown in FIG. 2A, the player metrics table 202 includes player identification 206 and player gaming metrics 204 that are tracked and processed during the gameplay of each player. In one example, during the gameplay of each player, the system may track various player conditions and the player gaming metrics 204 may include various parameters associated with the player such as the game level, ammunition amount, health level, armor level, currency amount, etc. In one embodiment, the game level can range from 1-100 or depend on the particular video game. In some embodiments, the ammunition amount, health level, and armor level may range from 1-100%.

After the system processes the respective player gaming metrics 204 associated with each player, the system may determine a total score 208 for each player. In some embodiments, the total score 208 is calculated based on the player gaming metrics 204, game conditions, and player interactivity conditions. In some embodiments, the player gaming metrics 204 and the total score 208 can be used to determine whether a player 102 qualifies for a particular dynamic quest 106. In one embodiment, a dynamic quest 106 may require a player 102 to meet a set of conditions and prerequisites to qualify for a particular dynamic quest 106. For example, a dynamic quest 106 may require a prerequisite total score that is greater than "50" and an ammunition level greater than 85% in order to qualify for the dynamic quest 106.

As further illustrated in FIG. 2A, each dynamic quest 106 may have a corresponding quest type 210, a description 212, and a reward 214 associated with the dynamic quest 106. In one embodiment, the dynamic quest type 210 may be an objective based dynamic quest or a proximity based dynamic quest. The objective based dynamic quest may be a task in the video game that the player 102 completes in order to obtain a reward. In some embodiments, proximity based dynamic quests are quests that are self-contained location-based objectives. In some embodiments, the description 212 and the reward 214 provides a brief description of the dynamic quest and the type of reward that is acquired upon engaging with the dynamic quest.

To provide an illustration of the player metrics table 202 in FIG. 2A, in one example, the system may track and determine that the player gaming metrics associated with player B indicates that player B is playing at level 5 and that the player B has an ammunition level of 75%, a health level of 89%, an armor level of 75%, and has accumulated 68 in currency throughout the gameplay. Based on the gaming metrics, game conditions, and player interactivity conditions of player B, the system may determine that player B has a total score of "75." Using the gaming metrics and the total score of player B, the system may generate and insert a dynamic quest 106 that involves "buying ammunition" in order to increase the ammunition level of player B by 5%.

FIG. 2B illustrates an embodiment of a dynamic quest table 216 showing a listing of dynamic quest types 218 and a general description 220 of the dynamic quest type. As shown in FIG. 2B, the dynamic quest types 218 may range and include a wide variety of types such as "finding an item" and "solving a puzzle or a riddle" in the video game. In addition to generating a dynamic quest 106 to enable acquisition of a reward that is useful for assisting the player 102 advance in the video game along the golden path 104, dynamic quests 106 may be generated so that the gameplay of the player 102 is enhanced or is maintained. In some embodiments, the player gaming metrics 204 of a player may provide information related to the sentiment of the player which shows that the player is unhappy with their gameplay. Accordingly, the system may generate dynamic quests 106 that may align with the interests and likes of the player so that their gameplay is more engaging. For example, based on the past experience of the player, the system may determine that the player enjoys game scenes involving verbal interactions with game characters. As a result, the system may generate a dynamic quest type that involves dialogue with game characters or any other type of dynamic quest that may involve the player verbally interacting with game characters.

FIG. 2C illustrates an embodiment of a main story quest table 224 illustrating various main story quests 226 and its corresponding main story quest sub-parts 228. As noted above, each golden path 104 associated with the gameplay of player 102 may include a plurality of main story quests. The main story quests and the corresponding main story quest sub-parts may vary and depend on the particular video game that is being played. The main story quest table 224 in FIG. 2C provides an example of the main story quest and main story quest sub-parts that may be available for a particular video game. As further illustrated in FIG. 2C, each main story quest sub-part 228 may include a quest type 230, a quest pre-requisite 232, and a reward 234.

In some embodiments, the quest pre-requisite 232 may indicate that a particular main story quest sub-part may require that the player meet a pre-requisite or a particular condition before being able to engage with the particular main story quest sub-part. For example, the main story quest sub-part that involves "assist injured soldiers" may be a task that involves defending fellow soldiers from enemy attack which may require a pre-requisite that the player 102 has sufficient ammunition in order to engage with the main story quest sub-part. As further illustrated in FIG. 2C, each main story quest sub-part may include a corresponding reward 234 that the player 102 can acquire after successfully engaging with the main story quest sub-part.

FIG. 2D illustrates an embodiment of a dynamic quest table illustrating predefined dynamic quests 236 that can be accessed to select a dynamic quest 106 for insertion along a golden path 104. In one embodiment, the table of predefined dynamic quests 236 can include a list of dynamic quests 106 and its corresponding dynamic quest sub-parts 238, a dynamic quest type 218, a dynamic quest pre-requisite 240, and a reward 242 for successfully engaging with the dynamic quest. The table of predefined dynamic quests 236 in FIG. 2D provides one example of the dynamic quest 106 and corresponding dynamic quest sub-parts 238 that may be available for a particular video game. In other embodiments, the total number of dynamic quest sub-parts 240 generated for a player 102 may vary and depend on the specific player 102 playing the video game. For example, a less experienced player 102 may be provided with only one dynamic quest sub-part 240 whereas a more advanced player may be provided with a greater number of dynamic quest sub-parts 240 so that their gameplay is more challenging.

In some embodiments, the dynamic quests 106 and its corresponding dynamic quest sub-parts 240 are inserted before or after the main story quests 226 along a golden path 104. As noted above, the dynamic quests 106 may be inserted in areas along a golden path 104 where the player 102 is determined to need assistance to advance in the video game. For example, based on the player gaming metrics 204 of a particular player 102, the system may determine that the health level of the player 102 is low. Accordingly, the system may generate and insert a dynamic quest 106 along the golden path of the player to enable the player to acquire a reward that will increase the health level of the player.

FIG. 2E illustrates an embodiment of a reward type table 244 illustrating the reward types 248 that a player 102 may acquire for successfully completing a dynamic quest 106. As illustrated, the table includes a reward identification 246 and the corresponding reward type 248. As further shown in FIG. 2E, the reward types 248 may vary and include a wide arrange of awards. In one embodiment, a reward may be useful for assisting the player 102 advance in the video game. In other embodiments, a reward such as points may provide the player with accolades so that the player is aware that the player is progressing in the video game.

Figure 3A:
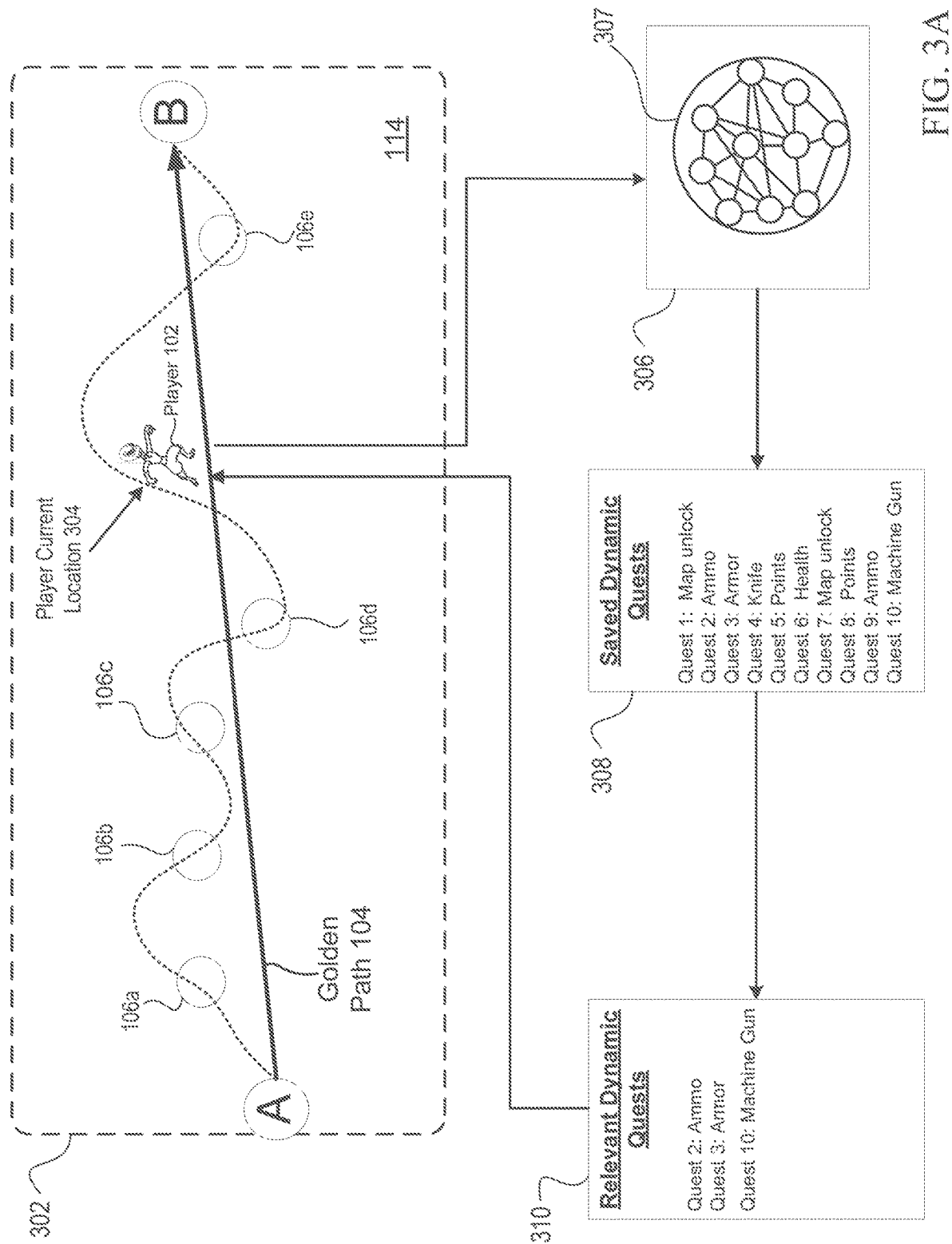
FIG. 3A shows a conceptual illustration of a method for storing dynamic quests in a dynamic quest interface and presenting a player with relevant dynamic quests that are useful for a specific point in time along the golden path, in accordance with an implementation of the disclosure.

FIG. 3A shows a conceptual illustration of a method for storing dynamic quests 106 in a dynamic quest interface and presenting a player 102 with relevant dynamic quests 106 that are useful for a specific point in time along the golden path 104. In one example, the method includes operation 302 that is configured to monitor and detect the activity of the player 102 and all of the actions occurring in the game environment 114 of the player 102 as the player 102 navigates along the golden path 104. For example, the player 102 may be moving along the golden path 104 to reach point B in the video game and the player 102 may be presented with a series of main story quests and various dynamic quests 106 along the golden path 104. In one embodiment, operation 302 can be configured to track the current location 304 of the player 102, the main story quests, the dynamic quests 106 that are provided to the player 102, the interactivity of the player 102, context of the gameplay, etc.

In some embodiments, the player 102 can be offered a dynamic quest 106 to engage with at any point in time as the player progresses along the golden path 104. In one embodiment, if the player 102 decides not to select or engage with the offered dynamic quest, operation 302 may be configured to add the dynamic quest to a queue such as a dynamic quest interface which can be accessed by the player at any desired time. As a result, the dynamic quest interface may include a plurality of dynamic quests 106 that the player 102 can return to and engage with even though the dynamic quest 106 is not being offered along the golden path 104 at the specific time.

The method flows to operation 306 where a gameplay model 307 can be used to enable the cleanup of dynamic quests in the dynamic quest interface. During the game session of the player 102, the player 102 can be provided with many options for different types of dynamic quests 106 that are dynamically and uniquely generated for the specific player 102 which can be added to the dynamic quest interface by the player 102. In some embodiments, the dynamic quest interface may become overwhelming and include dynamic quests that may not be useful to the player. Accordingly, in one embodiment, operation 306 can be configured to identify dynamic quests that are relevant to a user at a point in time. As the player 102 progresses along the golden path 104 and dynamic quests are added to the dynamic quest interface, certain dynamic quests may no longer be useful the player. For example, the dynamic quest interface may include dynamic quests that offers a reward of a knife and a gun. Operation 306 may determine that the player 102 will encounter main story quests and dynamic quests 106 that will require the player 102 to use a gun rather than a knife in order to succeed in the upcoming quests. Accordingly, operation 306 may identify the dynamic quest that offers the gun as a reward as being useful and relevant to the player.

The method flows to operation 308 where the operation can access the dynamic quest interface to determine the type of dynamic quests that are presently stored in the dynamic quest interface. Using the information obtained from the gameplay model 307, the relevant dynamic quests are identified and the method flows to operation 310 that includes a list of relevant dynamic quests that are presented to the player 102. As shown in FIG. 3A, at operation 310, dynamic quests that enables acquisition of a reward which includes ammunition, armor, and a machine gun are offered to the player 102 since they me be useful to the player when the player encounters dynamic quest 106e along the golden path 104.

Figure 3B:
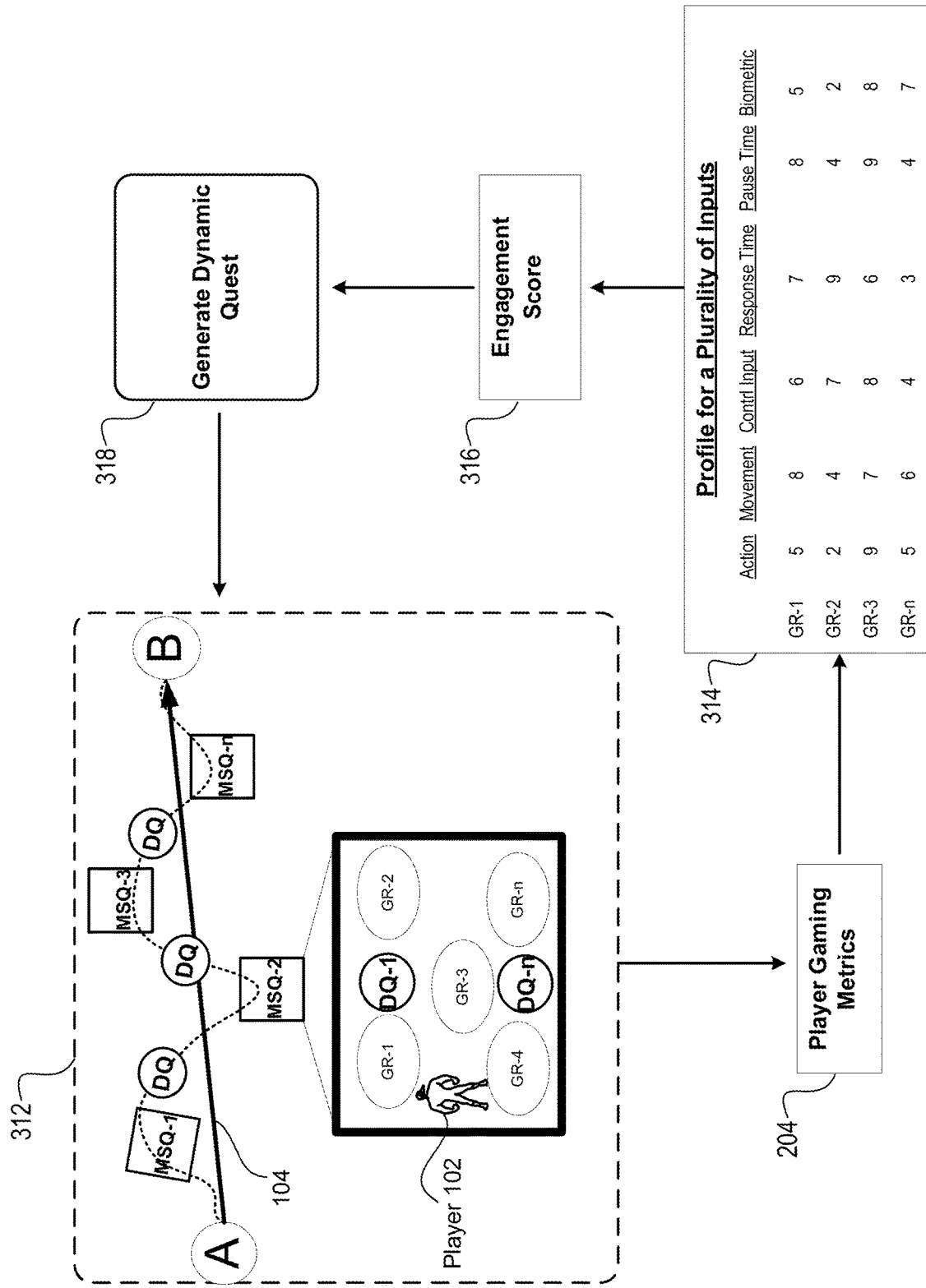
FIG. 3B shows a conceptual illustration of a method for generating a unique gaming experience for a player that includes a diversification of dynamic quests so that the player continues to be engaged with the video game.

FIG. 3B shows a conceptual illustration of a method for generating a unique gaming experience for a player 102 that includes a diversification of dynamic quests 106 so that the player 102 continues to be engaged with the video game. In one example, the method includes operation 312 that is configured to monitor and detect the activity of the player 102 and all of the actions occurring in the game environment of the player 102 as the player 102 navigates along the golden path 104. As shown in FIG. 3B, at operation 312, the game environment of the player includes a plurality of main story quests (e.g., MSQ-1-MSQ-n) and a plurality of dynamic quests 106. Referring to MSQ-2, MSQ-2 may include a plurality of game regions (e.g., GR-1-GR-n) that the player 102 can engage with (e.g., in the gaming environment context). In other embodiments, one or more dynamic quests 106 may be inserted into a main story quest, after a main story quest, or before a main story quest.

In another embodiment, the method may further include parsing the gameplay data to identify player gaming metrics 204 as the player progresses along the golden path 104. In one embodiment, the player gaming metrics 204 may capture various data such as player experience, instant game conditions, player game state, player interactivity, and player sentiment. In other embodiments, the player gaming metrics 204 may include a profile for a plurality of inputs received for a game region associated with one of the plurality of main story quests.

In some embodiments, the method may include operation 314 that is configured to extract and identify the profile for a plurality of inputs from the player gaming metrics 204. In some embodiments, the profile for a plurality of inputs may include various data associated with the player for a particular game region. In one example, the profile for a plurality of inputs may include data that identifies the actions, movements, controller inputs, response time, pause time, biometric information, etc. associated with the player during the gameplay. In one embodiment, the plurality of inputs can be normalized and range from 1-10.

In another embodiment, the method may further include operation 316 that is configured to generate an engagement score of the player 102 based on the profile of the plurality of inputs and the game region. In one embodiment, the engagement score can be normalized based on the type of actions occurring in the game region and range from 1-10. In one embodiment, an engagement score of '10' may indicate that the engagement of the player is optimum. Conversely, an engagement score of '1' may indicate that the engagement of the player is not engaged with the gameplay. In some embodiments, the engagement score can be compared to a score threshold that is associated with a particular game region to determine whether the player 102 is engaged with a particular game region. For example, if the engagement score of the player exceeds the score threshold for a game region, this may indicate that the player is engaged with the game region. In another example, if the engagement score of the player does not exceed the score threshold for a game region, this may indicate that the player is engaged with the game region. Accordingly, the system may generate a dynamic quest 106 and provide it to the player 102 so that the engagement score of the player is increased and result in the player being engaged with the gameplay.

In some embodiments, the method may include operation 318 that is configured to generate a dynamic quest 106 for the player 102. In some embodiments, the dynamic quest 106 is generated responsive to a determination that the engagement score has fallen below a score threshold for the game region. For example, a game region in the video game may have a score threshold of '3' because it requires minimal player engagement. In this game region, the game region requires minimum player engagement since the game region includes dialog between game characters in the video game to lay the foundation of the storyline. In another example, a game region in the video game may require a score threshold of '8' because the game region includes a battle scene with enemy soldiers which requires a significant amount of player engagement and player interaction to be successful with the game region. Accordingly, if the engagement score falls below a score threshold for the game region, operation 318 may generate a dynamic quest to help the player become more engaged with the gameplay. In another embodiment, operation 318 is configured to generate a dynamic quest 106 so that the quest type is arranged to increase the engagement score of the player 102 above the score threshold. For example, during the battle scene with enemy soldiers, the engagement score of the player 102 may fall below the score threshold. Accordingly, operation 318 may generate dynamic quests that can include a lower number of enemy soldiers so that it will be easier for the player 102 to defend against the attacks which can increase the engagement score of the player 102.

FIG. 4 illustrates an embodiment of a dynamic quest interface 402 of a player 102 that incudes saved dynamic quests 404 and relevant dynamic quests 416 that may be useful to the player 102. As illustrated, each saved dynamic quest 404 includes a dynamic quest identification 406a, a dynamic quest type 408a, a dynamic quest description 410a, and a reward 412a that corresponds to the dynamic quest. As noted above, as the player progresses along the golden path 104, the player may be offered a dynamic quest 106 which the player can decline to engage with at the time the dynamic quest is provided to the player. Instead of engaging with the dynamic quest at the particular moment when the dynamic quest is provided to the player, the dynamic quest can be added to the dynamic quest interface 402.

As the gameplay of the player progresses, the number of saved dynamic quests 404 may continue to increase and may become overwhelming to the player. In some embodiments, the saved dynamic quests 404 may include various dynamic quests that may no longer be relevant, useful, or appealing to the player 102. Accordingly, the system may use the gameplay model 307 to determine which saved dynamic quests may be relevant, useful, or appealing to the player 102. In one embodiment, the gameplay model 307 can be used to determine the type of main story quests and dynamic quests that the player 102 may encounter at various points along the golden path 104. Accordingly, the gameplay model 307 can be used to help identify the relevant dynamic quests 416 that are useful for a player at a specific point in time along the golden path 104

As further illustrated in FIG. 4, the dynamic quest interface 402 may include a plurality of relevant dynamic quests 416 that are identified as being useful and relevant to the player. In some embodiments, dynamic quests that were previously offered to the player and added to the queue may be excluded from the list of relevant dynamic quests 416 because they may not be useful to the player at a more advanced point in the gameplay. For example, as shown in FIG. 4, dynamic quest 7 that involves speaking to the Governor in order to unlock a map may no longer be useful to the player since the player has already reached the desired location that is shown on the map.

As shown in FIG. 4, each of the relevant dynamic quests 416 includes a dynamic quest identification 406b, a dynamic quest type 408b, a dynamic quest description 410b, and a reward 412b that corresponds to the dynamic quest. For example, as shown, the relevant dynamic quests 416 include dynamic quests that relate to buying ammunition (e.g., DQ 2), finding armor (e.g., DQ 3), searching for hidden ammunition (e.g., DQ 9), and following the team leader to acquire a machine gun (e.g., DQ 10). In one example, the relevant dynamic quests 416 and its corresponding reward may be useful for the player 102 in an upcoming scene that involves a gun fight against enemy soldiers.

In some embodiments, the identification of the relevant dynamic quests 416 for inclusion into the dynamic quest interface 402 is based on processing the player gaming metrics 204 and the saved dynamic quests 404 through the gameplay model 307. The gameplay model 307 is configured to identify features from the player gaming metrics 204 and the saved dynamic quests 404 to classify the features using one or more classifiers. The classified features are then used by the gameplay model 307 to predict and identify which one of the saved dynamic quests 404 may be relevant to the player 102. In some embodiments, the type of reward offered by the dynamic quest, the interests of the player, and the type of game scenes that the player may encounter along the golden path may be taken into consideration when determining whether a dynamic quest is relevant to the player. In other embodiments, when a dynamic quest is determined to be non-useful the player, those dynamic quests can be eliminated or excluded from the list of the relevant dynamic quests 416.

Figure 5A:
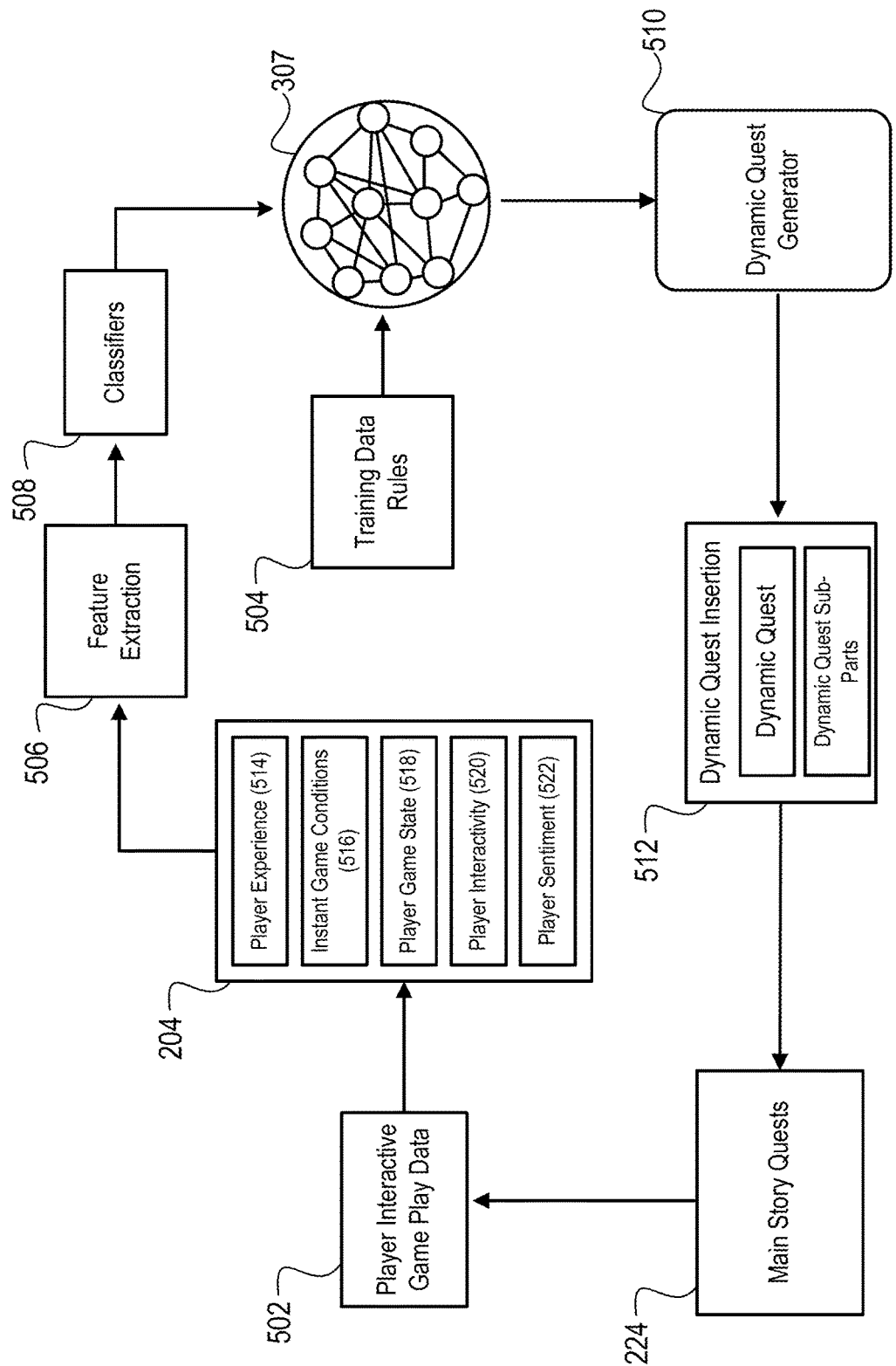
FIG. 5A illustrates an embodiment of a method for using a gameplay model to generate dynamic quests for a player using player gaming metrics and training data rules as inputs, in accordance with an implementation of the disclosure.

FIG. 5A illustrates an embodiment of a method for using a gameplay model 307 to generate dynamic quests 106 for a player 106 using player gaming metrics 204 and training data rules 504 as inputs. As noted above, the generated dynamic quests 106 may be uniquely generated for each player and inserted along the golden path 104 of the player to provide the player with a customized gaming experience.

In one example, the method includes accessing player interactive gameplay data 502 from a video game that is being played by the player 102. In one embodiment, the player interactive gameplay data 502 may include gameplay metadata such as state data that identifies all of the actions, inputs, and moves made by the player 102 during the gameplay. In another embodiment, the method may further include parsing the player interactive gameplay data 502 to extract and identify the player gaming metrics 204 that is associated with the gameplay of the player 102. In one embodiment, the player gaming metrics 204 may capture various data such as player experience 514, instant game conditions 516, player game state 518, player interactivity 520, and player sentiment 522.

In one embodiment, the player experience 514 may include various attributes and characteristics of the player 102 such as gaming experience, gameplay history, viewing history, gaming skill level, preferences, interests, disinterests, etc. In some embodiments, the instant game conditions 516 may include data associated with the context of the gameplay, characters in the gameplay, current state of the gameplay, etc. The player game state 518 may include data that identifies the level of the game, total score, and various parameters associated with the status of the player, e.g., ammunition level, health level, armor level, currency amount, etc. In some embodiments, the player interactivity 520 may include information associated with the player's interactions when engaging with the main story quests, dynamic quests, and other interactions when navigating along the golden path. For example, the player interactivity 520 may include information related to the player's engagement with the main story quests and dynamic quests, the context of the interactions, actions performed by the player, etc. In some embodiments, the player sentiment 522 may include information related to the emotion and mood of the player during the gameplay.

In another embodiment, the method may further include a feature extraction 506 operation that is configured to receive the player gaming metrics 204 to extract and identify various features in the player gaming metrics 204. After the feature extraction 506 operation identifies the features associated with the player gaming metrics, classifiers 508 can be configured to classify the extracted features using one or more classifiers to form a gameplay model 307 for the player in regard to the video game.

In some embodiments, the method flows to the gameplay model 307 which is configured to receive as inputs the classified features from classifiers 508 and training data rules 504. In one embodiment, the gameplay model 307 may be constructed over time using the training data rules 504. The gameplay model 307 may use one or more machine learning models that can be trained using the training data rules 504. The training data rules 504 may include a plurality of training data rules that can be used to construct the gameplay model 307 model and enforce connections between nodes of the gameplay model 307. In another embodiment, other inputs that are not direct inputs or lack of input/feedback, may also be taken as inputs to the gameplay model 307. For example, certain types of dynamic quests 106 that are offered to a player 106 may help determine a player's interest or disinterest in the dynamic quest. If a player selects a dynamic quest to engage with, this may indicate that the player has an interest in the dynamic quest. Conversely, if the player does not select a dynamic quest to engage with, this may indicate that the player does not have an interest in the dynamic quest.

In other embodiments, each player may have a corresponding player gaming model that can be used to custom tailor the generation of dynamic quests for each player. In one example, the player gaming model can be defined by the players historical play activity, likes, dislikes, achievements, skill level, etc.

In one example, the player gaming metrics 204 may indicate that the player is engaged with a main story quest that involves a combat scene where the player uses a knife to fight enemy characters. During the combat scene, the player game state 518 and the player sentiment 522 indicates that the player 102 was severely injured by the enemy characters and that the player 102 did not like using the knife. Using the data provided by the player gaming metrics 204, the gameplay model 307 may predict dynamic quests that offers various types of combat weapons that the player may have an interest in using other than the knife, e.g., gun, bomb, bow & arrow, sword, etc.

In some embodiments, the dynamic quest generator 510 can use the gameplay model 307 to determine the type of dynamic quests 106 and dynamic sub-parts to generate for a player 102. In one embodiment, the dynamic quest generator 510 can generate dynamic quests based on examination of the gameplay model 307 and the training data rules 504. In other embodiments, the dynamic quest generator 510 may be configured to generate the dynamic quests 106 and dynamic sub-parts based on meeting a specific set of conditions and prerequisites. For example, if the player 102 exceeds a specific total score in the video game, the dynamic quest generator 510 can generate dynamic quests 106 that allows the player to engage in game scenes that enables the acquisition of a special skill and ability. In other embodiments, the dynamic quest generator 510 can use the gameplay model 307 to generate dynamic quests 106 and dynamic sub-parts that provides the player with assistance based on a current scenario of gameplay, a goal being attempted by the player, a level of success or failure being experienced by the player, a game asset needed by the player to advance, a detected level of engagement or disengagement by the player, a determined sentiment of the player, a failure to achieve a goal, a pre-requisite of achieving one or more tasks or goals, or a combination of two or more thereof.

In some embodiments, after the dynamic quest generator 510 generates the dynamic quests 106 and the dynamic sub-parts, the dynamic quest insertion 512 operation is configured insert the dynamic quest 106 and the dynamic quest sub-parts along the golden path 104 to present the quests to the player and to enable acquisition of a corresponding reward. In one embodiment, the dynamic quests can be inserted before or after a main story quest 226. In one example, the system may determine that the player is approaching a main story quest that requires the use of a specific weapon and skill to succeed in the main story quest, e.g., sniper gun and long-range shooting. Accordingly, before the player reaches the main story quest, the system may generate a dynamic quest that allows the player to acquire the sniper gun and the skill of long-range shooting.

In accordance with another embodiment, the dynamic quest generator 510 can be configured to diversify the dynamic quest selection process and to prevent the generation of dynamic quests that would wear down a player's desire to play the video game resulting in the player being disengaged with the video game. In one embodiment, the dynamic quest generator 510 can generate dynamic quests 106 based on a historical analysis of the player's aversion to types of dynamic quests 106 or eagerness to play specific types of dynamic quests during a game session. For example, the player gaming metrics 204 may identify the gameplay history and viewing history of a player which may indicate the type of dynamic quests that the player may have an interest or disinterest in engaging with. As a result, the dynamic quest generator 510 may generate dynamic quests that are aligned with the interests of the player so that the player remains engaged with the game session.

In some embodiments, the dynamic quest generator 510 can be configured to limit the complexity of dynamic quests 106 such that the number of required components that are required to achieve the reward associated with the dynamic quest is limited. For example, a dynamic quest 106 that generally requires a player to perform five objectives to acquire the reward can be limited to two objectives. In one embodiment, the dynamic quest generator 510 can be configured to generate dynamic quests 106 that meets the gameplay duration of the player. For example, the player gaming metrics 204 may indicate that the average gameplay duration of a player is about 45 minutes. Accordingly, the dynamic quest generator 510 may generate dynamic quests that will limit the gameplay duration of the player to about 45 minutes.

In some embodiments, the dynamic quest generator 510 may generate dynamic quests 106 that steer one or more players to play interactively at a specific gaming location (e.g., in-game meetup space 108, co-op game space 110). When the players engage with one another at the gaming location, the dynamic quests 106 can result in an increase or decrease in the number of interactions players have with other players. For example, when players of different experience and different levels join together and engage with one another at the co-op game space 110, the player that is granted access to the co-op game space 110 may be limited to interact in the co-op game space 110 for a specified duration before returning to their respective game environment.

In other embodiments, the dynamic quest generator 510 can select dynamic quests based on the reward type that a player would like to achieve and would help the player advance in the video game in order to keep the player engaged with the video game. In some embodiments, the dynamic quest generator 510 can throttle back the number of dynamic quests that are offered to the player or provide dynamic quests with an increase or decrease in difficulty. For example, based on the gaming metrics 204 of the player, the system may determine that the player is frustrated with their gameplay because there are too many dynamic quests and are difficult to achieve. Accordingly, the system may dynamically throttle down the number of dynamic quests and throttle down the difficulty of the dynamic quests. As a result, by dynamically adjusting and generating dynamic quests based on the desires of the player, the players may continue to be engaged with their gameplay and continue to play.

Figure 5B:
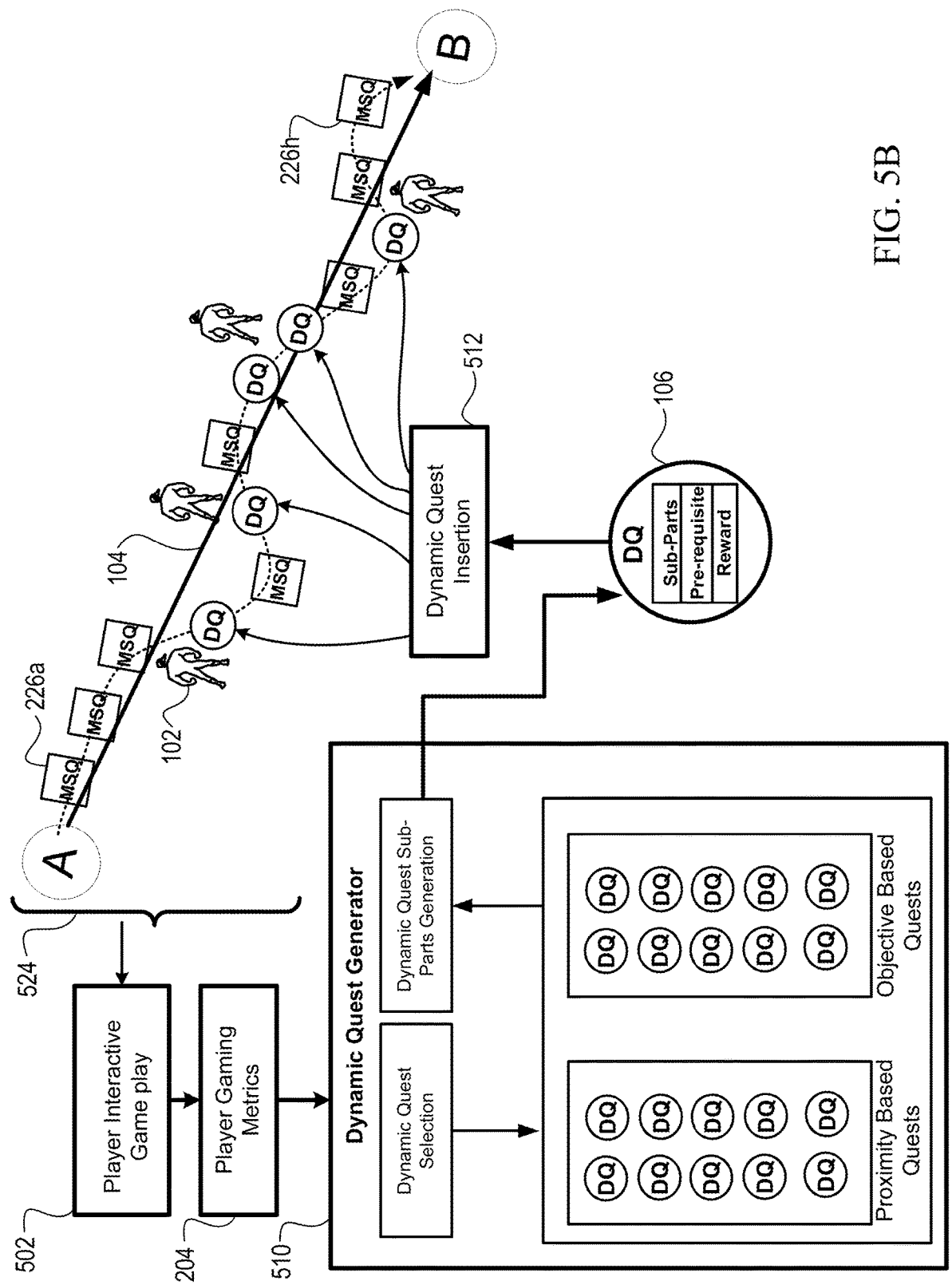
FIG. 5B shows a conceptual illustration of a method for generating a unique gaming experience for a player using player interactive gameplay data associated with the gameplay of the player to generate one or more dynamic quests 106 for insertion along the golden path of the player, in accordance with an implementation of the disclosure.

FIG. 5B shows a conceptual illustration of a method for generating a unique gaming experience for a player playing a video game using player interactive gameplay data 502 associated with the gameplay of the player to generate one or more dynamic quests 106 for insertion along the golden path 104 of the player 102. In one example, the method includes operation 524 that is configured to monitor and track the actions of the player and the activity occurring in the game environment. For example, as illustrated, the game environment of the player 102 illustrates the player 102 moving along the golden path 104 which includes a plurality of main story quests (MSQ) 226a-226h and dynamically generated dynamic quests 106 along the golden path 104.

In another embodiment, the method flows to an operation that is configured to extract the player interactive gameplay data 502 from the gameplay of the player 102. In another embodiment, the method further includes processing the player interactive gameplay data 502 to identify the player gaming metrics 204 as the player progresses along the golden path 104. As noted above, the player gaming metrics 204 may include various parameters associated with the gameplay of the player such as player experience 514, instant game conditions 516, player game state 518, player interactivity 520, and player sentiment 522. For example, at any point during the gameplay of the player, the player's score, game level, emotion, and location along the golden path can be determined which can be used to generate the dynamic quest 106 for the player 102.

In another embodiment, the method flows to the dynamic quest generator 510 which is configured to generate a dynamic quest 106 and dynamic quest sub-parts for the player 102. In one embodiment, the dynamic quest generator 510 can use the gameplay model 307 to generate dynamic quests 106 and one or more dynamic quest sub-parts for the player. For example, based on the player gaming metrics 204, the gameplay model 307 can be used to determine that the player failed to overtake an enemy character in the game and that the player is becoming disengaged with the gameplay. As a result, the gameplay model 307 can be used to generate a dynamic quest that will provide the player with game assets that will help the player defeat the enemy character. In some embodiments, the dynamic quest generator 510 may generate a dynamic quest 106 that includes one or more dynamic quest sub-parts. As noted above, a dynamic quest 106 may be an objective based dynamic quest or a proximity based dynamic quest. The objective based dynamic quest may be a task in the video game that the player 102 completes in order to obtain a reward. In some embodiments, proximity based dynamic quests are quests that are self-contained location-based objectives. In other embodiments, instead of generating a dynamic quest, the dynamic quest generator 510 may be configured to access specific tables of predefined dynamic quests. For example, dynamic quest generator 510 may access the predefined dynamic quests 236 in FIG. 2D and select a dynamic quest and dynamic quest sub-parts for insertion along the golden path 104 of the player 102.

In another embodiment, after generating the dynamic quests 106 or accessing specific tables of predefined dynamic quests, the method flows to the dynamic quest insertion 512 operation which configured insert the dynamic quest 106 and dynamic quest sub-parts along the golden path 104. As illustrated, the dynamic quests 106 may be inserted before or after a main story quest 226. In another embodiment, the dynamic quest 106 may be inserted along the golden path and presented to the player if the player meets a pre-requisite condition that may be associated with the dynamic quest. For example, a dynamic quest may have a pre-requisite that requires the player exceeds a total score of 200 points in order to engage with the dynamic quest. Accordingly, the dynamic quest may be inserted along the golden path at a point in time that the player is predicted or has attained a score of 200 points or greater.

Figure 6:
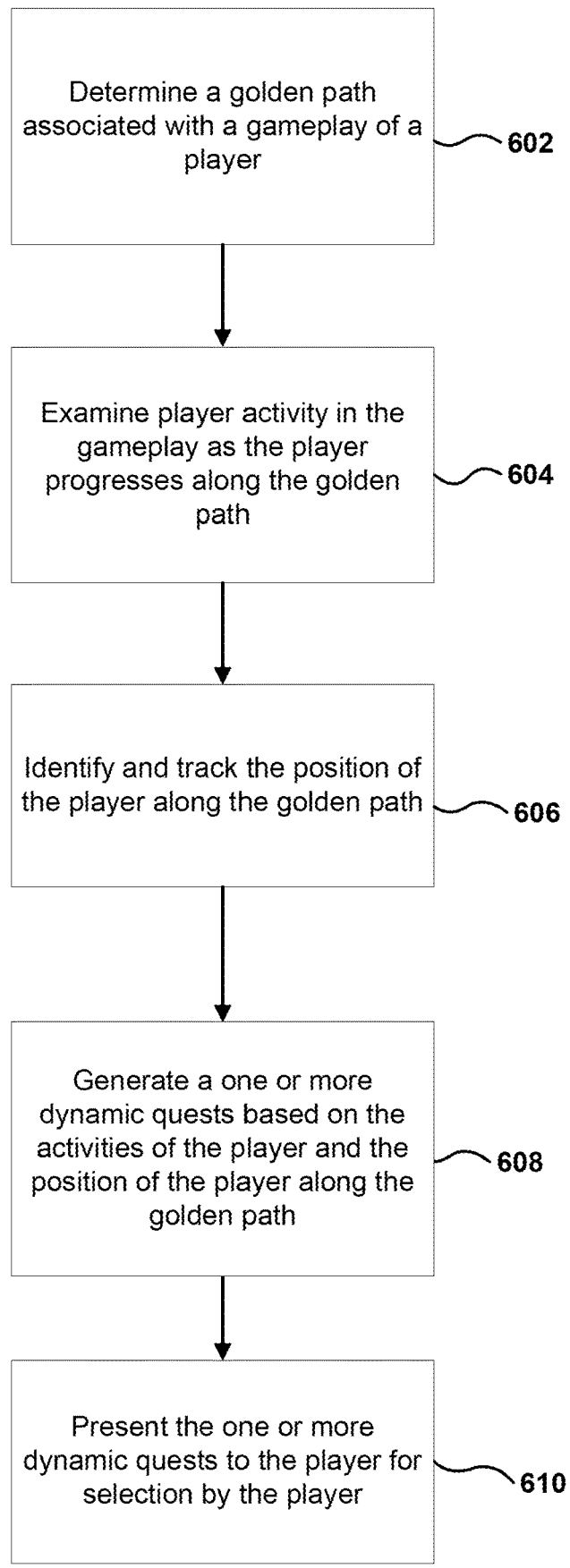
FIG. 6 illustrates a method for executing a video game for a player to provide the player with a unique gaming experience with dynamically generated dynamic quests along a golden path, in accordance with an implementation of the disclosure.

FIG. 6 illustrates a method for executing a video game for a player 102 to provide the player 102 with a unique gaming experience with dynamically generated dynamic quests 106 along a golden path 104. In one embodiment, the method includes an operation 602 that is configured to determine a golden path associated with a gameplay of a player. For example, a player begins their gameplay at an initial point (e.g., point A) along a golden path 104 in the game environment which leads to player to a desired point in the video game (e.g., point B). The gameplay of the player may include a golden path 104 which guides the player from point A to point B in the game environment. As noted above, each golden path 104 may include a plurality of main story quests 226 that are associated with the golden path 104 which are presented to every player who engages with the golden path 104.

The method shown in FIG. 6 then flows to operation 604 where the operation is configured to examine the activity of the player 102 in the gameplay as the player progresses along the golden path 104. In one embodiment, during the gameplay of the player 102, operation 604 can be configured to determine the various actions of the player and determine what is occurring in the game. Using the gameplay data, operation 604 can process the gameplay data to identify the player gaming metrics 204 at any point in time. In one example, the player gaming metrics 204 may include various parameters associated with the gameplay of the player such as player experience 514, instant game conditions 516, player game state 518, player interactivity 520, and player sentiment 522. In other embodiments, operation 604 can be configured to determine game regions along the golden path 104 where the player 102 is determined to need assistance advancing in the video game. For example, the player gaming metrics 204 may provide information indicating that the player has a low health level and is approaching a main story quest that involves an intense fight scene with a plurality of enemy soldiers. Accordingly, when a player reaches a low health level at a specific region along the golden path 104, operation 604 may identify this region as a game region where the player is in need of assistance to advance in the video game.

The method flows to operation 606 where the operation is configured to identify and track the position of the player 102 along the golden path 104. During the gameplay of the player, the player may advance along the golden path 104 in a direction toward a desired destination in the game environment. The player may inadvertently deviate from the golden path 104 and progress in a direction away from the desired destination. As a result, operation 606 may identify game regions in the gaming environment where the player may be lost and identify game regions where to insert dynamic quests to entice or nudge the player to make their way back on track along the golden path 104.

The method shown in FIG. 6 then flows to operation 608 where the operation is configured to generate a one or more dynamic quests 106 and dynamic quest sub-parts based on the activities of the player and the position of the player along the golden path. In one embodiment, at game regions where the player is in need of assistance to advance in the video game, operation 608 is configured to generate dynamic quests 106 to help the player advance in the video game. For example, the player gaming metrics 204 can be used to help identify game regions along the golden path when the player may need assistance, e.g., attempting a goal, failing a goal, requiring an asset to advance, disengaging with the gameplay, etc. As a result, operation 608 may be configured to generate the dynamic quest to enable acquisition of a reward to help the player advance in the video game. In some embodiments, operation 608 may use a dynamic quest generator 510 to generate the dynamic quests 106 for the player 102. As noted above, the dynamic quest generator 510 can use the gameplay model 307 to generate dynamic quests 106 and the one or more dynamic quest sub-parts for the player.

The method flows to operation 610 where the operation is configured to present the one or more dynamic quests 106 to the player by inserting the one or more dynamic quests 106 the golden path 104. In some embodiments, inserting the one or more dynamic quests 106 along the golden path 104 enables the player to acquire the reward associated with the dynamic quest. In another embodiment, operation 610 is configured to insert the dynamic quests 106 along the golden path 104 during gameplay of the video game at game regions where the player is determined to need assistance advancing in the video game. For example, at a game region along the golden path, the player is determined to have a low health level. Prior to reaching a game scene that involves a combat fight with enemy soldiers, one or more dynamic quests 106 that enables the player to increase their health level may be inserted along the golden path before the player engages in the combat fight.

Figure 7:
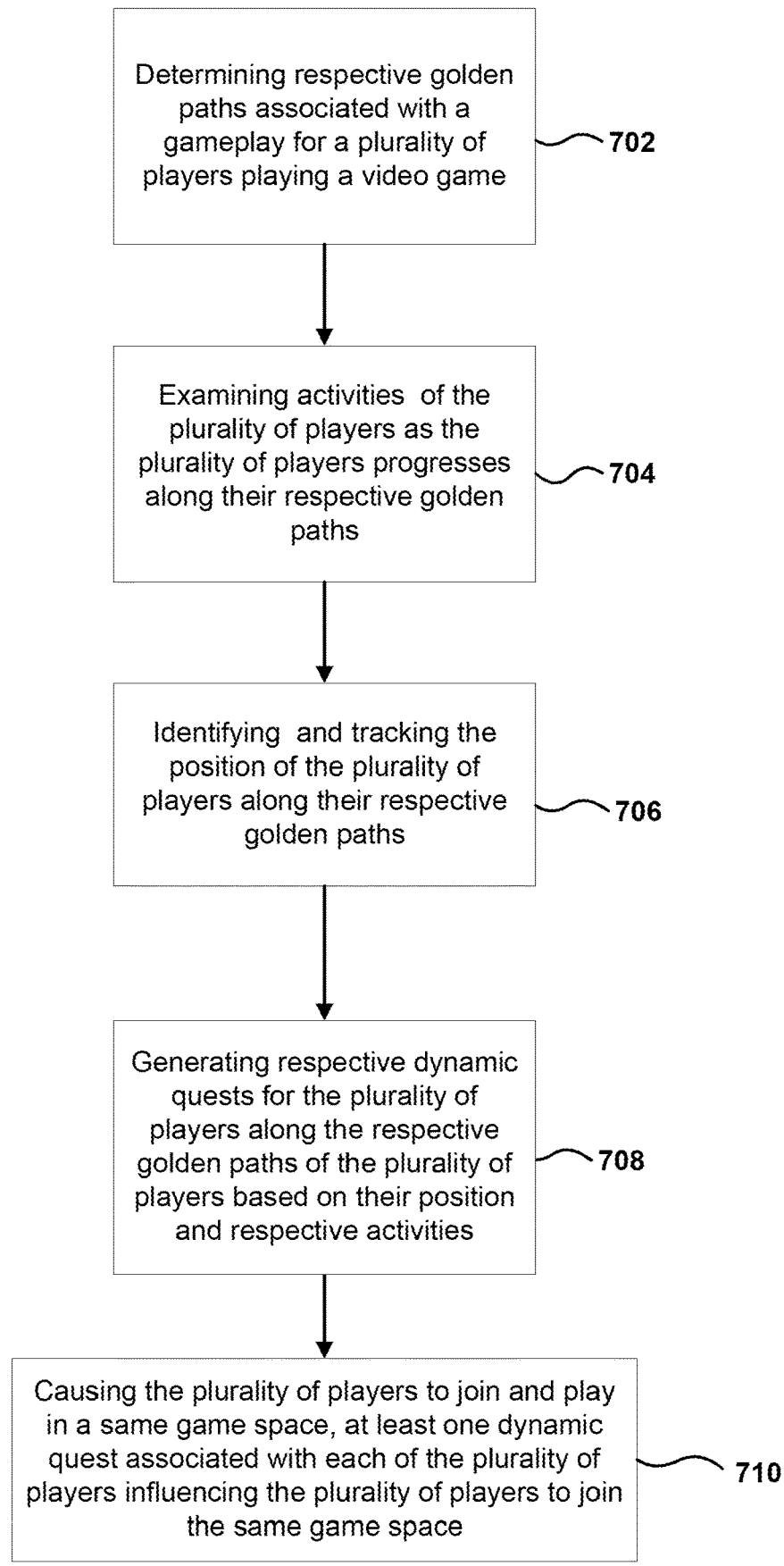
FIG. 7 illustrates a method for executing a video game for a plurality of players where dynamically generated dynamic quests are generated to move the plurality of players along their respective golden paths to cause the plurality of players to join at an in-game meetup space, in accordance with an implementation of the disclosure.

FIG. 7 illustrates a method for executing a video game for a plurality of players where dynamically generated dynamic quests 106 are generated to move the plurality of players along their respective golden paths 104 to cause the plurality of players to join at an in-game meetup space 108. In one embodiment, the method includes an operation 702 that is configured to determine the respective golden paths associated with a gameplay for a plurality of players playing a video game. In one embodiment, the plurality of players may be playing a video game such as an online multiplayer video game where each player may have a respective golden path 104 that leads each player to a desired destination in the game environment.

The method shown in FIG. 7 then flows to operation 704 where the operation is configured to examine the activity of the plurality of players as the plurality of players progresses along their respective golden paths. In one embodiment, operation 704 can be configured to determine the various action of each player and determine what is occurring in the game. In some embodiments, operation 704 can process the gameplay data of each player to identify the player gaming metrics 204 at any point in time. For example, referring to the player metrics table 202 in FIG. 2A, operation 704 can be configured to process the gameplay data of each player (e.g., Players A-N) and identify the player gaming metrics 204 for each player. The method flows to operation 706 where the operation is configured to identify and track the position of each player as they progress along their respective golden paths.

The method shown in FIG. 7 then flows to operation 708 where the operation is configured to generate respective dynamic quests for each of the plurality of players along the respective golden paths of the players based on their respective position, activity, and player gaming metrics 204. In some embodiments, operation 708 can be configured to generate the dynamic quest 106 to enable acquisition of a reward to help the player advance in the video game. In some embodiments, operation 708 may use a dynamic quest generator 510 to generate the dynamic quests 106 for each of the players 102.

The method shown in FIG. 7 flows to operation 710 where the operation is configured to cause the plurality of players to join and play in a same game space such as the in-game meetup space 108. In some embodiments, at least one dynamic quest associated with each of the plurality of players can influence each of the plurality of players to join the in-game meetup space 108. In some embodiments, at the in-game meetup space 108, the players may engage with one another to perform various tasks or objectives, e.g., battling together, working together to accomplish a goal, strategizing to accomplish a mission, etc.

Figure 8:
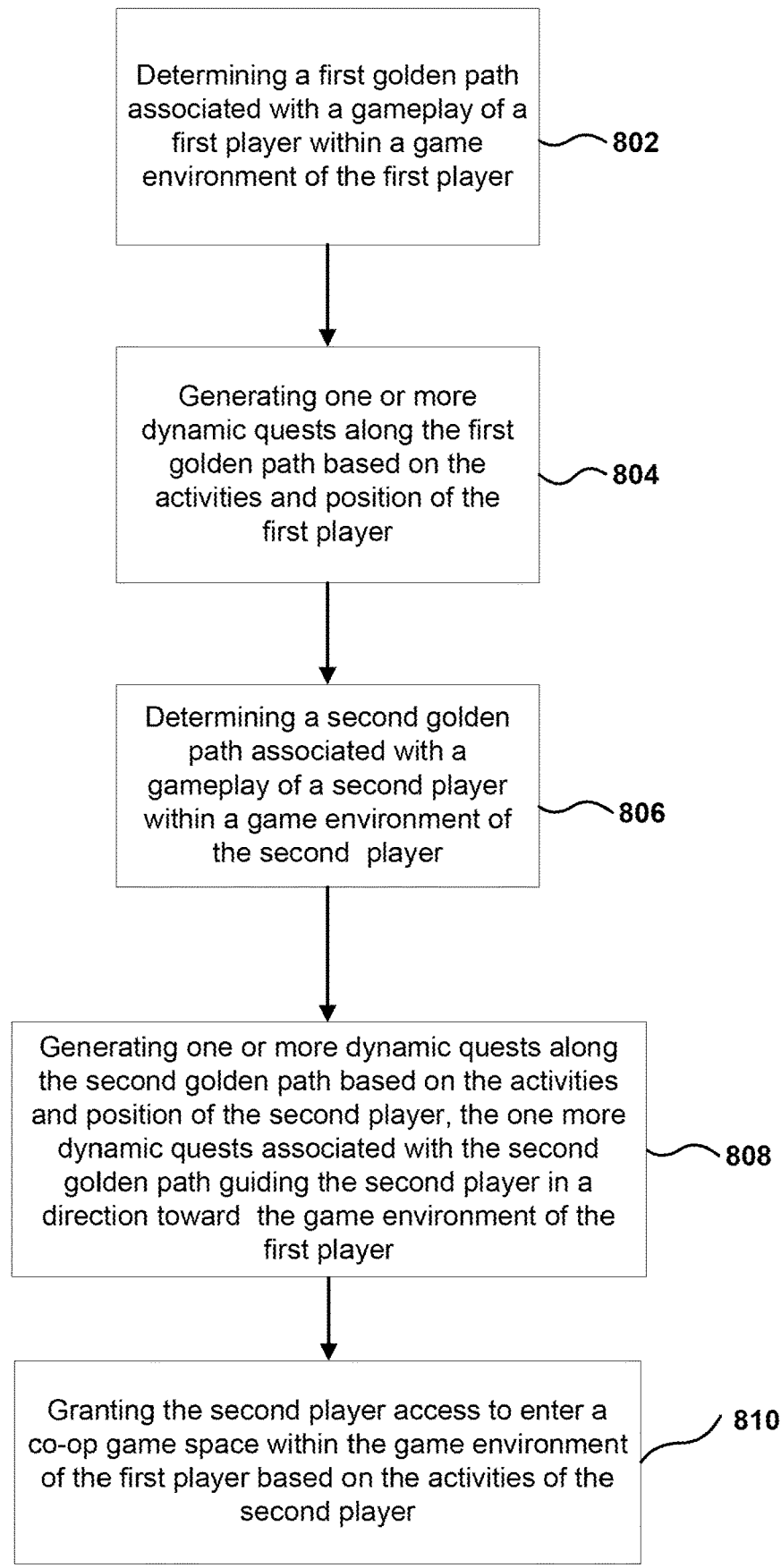
FIG. 8 illustrates a method for executing a video game for a plurality of players that includes dynamically generated dynamic quests and a co-op game space where players of different experiences and different levels can join together and engage with one another in the co-op game space, in accordance with an implementation of the disclosure.

FIG. 8 illustrates a method for executing a video game for a plurality of players 102 that includes dynamically generated dynamic quests 106 and a co-op game space 110 where players of different experiences and different levels can join together and engage with one another in the co-op game space 110. In one embodiment, the method includes an operation 802 that is configured to determine a first golden path associated with a gameplay of a first player within a game environment of the first player. In one embodiment, a plurality of players may be playing a video game such as an online multiplayer video game where the players may be playing at different levels and have different levels of gaming experience. Accordingly, each player playing the video game may be playing in a different game environment 114 that includes a golden path 104 with main story quests and dynamically dynamic quests 106.

The method shown in FIG. 8 then flows to operation 804 where the operation is configured to generate one or more dynamic quests along the first golden path based on the activities, position, and player gaming metrics 204 of the first player. In one embodiment, operation 804 may be configured to use a dynamic quest generator 510 to generate the dynamic quests 106 for inserting along the golden path 104. In some embodiments, the dynamic quests 106 may nudge a player or entice a player to move in a particular direction in the game environment of the player. In one example, if a player is lost or disoriented during the gameplay, a dynamic quest 106 may help guide the player in a direction toward the golden path.

The method shown in FIG. 8 flows to operation 806 where the operation is configured to determine a second golden path associated with a gameplay of a second player within a game environment of the second player. As noted above, a plurality of players may be playing a video game and the players may be playing at different levels and have different levels of gaming experience. Accordingly, in one embodiment, operation 806 is configured to determine the golden path 104 associated with the second player and to identify the main story quests and dynamically dynamic quests 106 along the golden path 104 of the second player.

The method flows to operation 808 where the operation is configured to generate one or more dynamic quests along the second golden path based on the activities, position, and player gaming metrics 204 of the of the second player. In some embodiments, the one more dynamic quest associated with the second golden path guides the second player in a direction toward the game environment of the first player. Since the players are playing in different levels and the game environment of the first player and the game environment of the second player are different, operation 808 is configured to generate dynamic quests that nudges the second player in a direction toward the game environment of the first player so that the second player can join the co-op game space 110 in the environment of the first player.

The method in FIG. 8 flows to operation 810 where the operation is configured to grant the second player access to enter the co-op game space 110 within the game environment of the first player based on the activities and gaming metrics 204 of the second player. In some embodiments, the co-op game space 110 may allow players of different experience and players that are playing in different levels to join together and engage with one another in the same game space. In one example, the co-op game space 110 may include advanced gaming scenes that are associated with the first player since the first player is playing at a more advance level than the second player. In one embodiment, the first player may grant the second player access to join the gameplay in the co-op game space 110 for a period of time. In some embodiments, the second player may be granted access based on their player gaming metrics 204. For example, access to the co-op game space 110 may have a prerequisite requirement such as a specific total score, a health level, currency amount, specific weapons, etc. Once the second player engages with the first player in the co-op game space 110, the second player may return to their game environment and continue along their golden path toward a desired destination.

Figure 9:
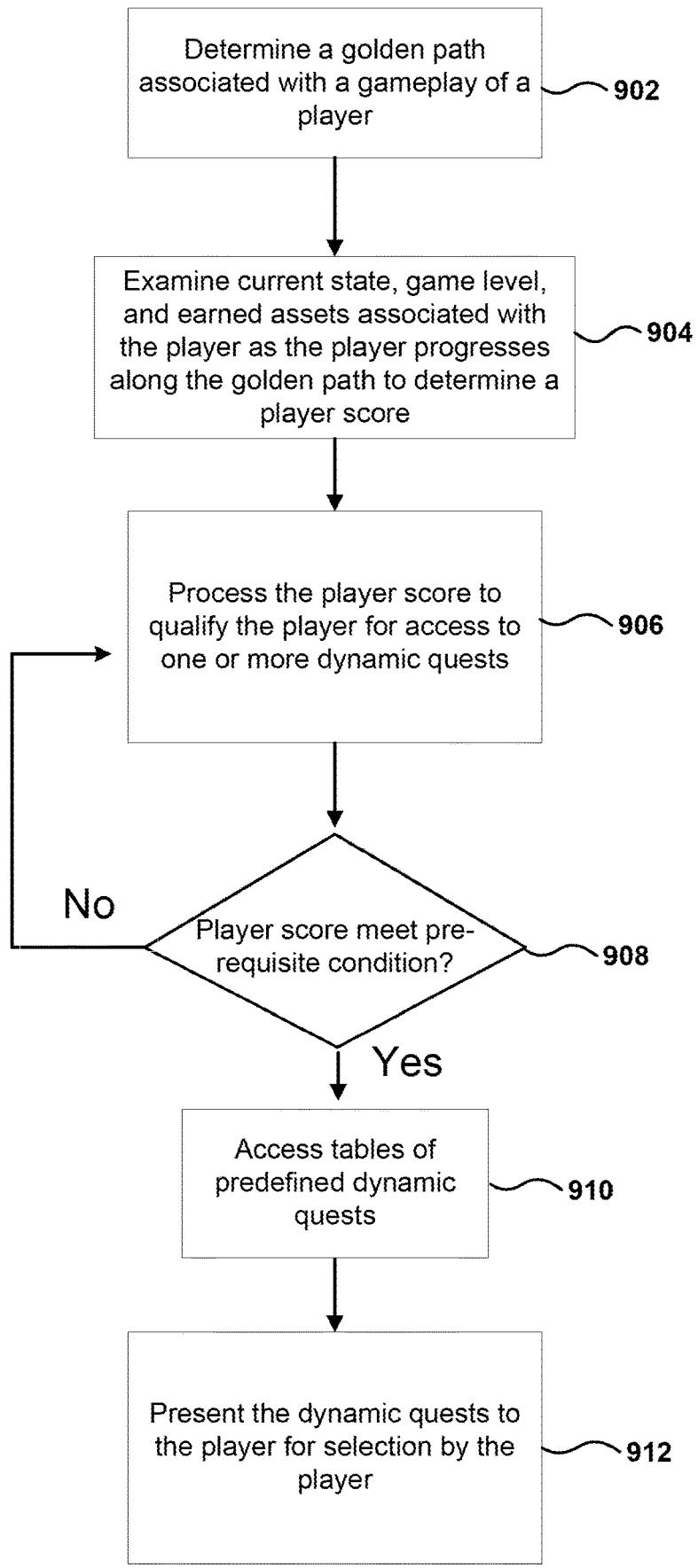
FIG. 9 illustrates a method for executing a video game for a player where dynamic quests are spawned dynamically by accessing specific tables of predefined dynamic quests, in accordance with an implementation of the disclosure.

FIG. 9 illustrates a method for executing a video game for a player where dynamic quests 106 are spawned dynamically by accessing specific tables of predefined dynamic quests. In one embodiment, the method includes an operation 902 that is configured to determine a golden path 104 associated with a gameplay of a player 102. In one embodiment, as noted above, each golden path 106 may include a plurality of main story quests 226 that are associated with the golden path 106. The method in FIG. 9 then flows to operation 904 where the operation is configured to examine the player gaming metrics 204 which may include the current state, game level, and earned assets associated with the player as the player progresses along the golden path. In one embodiment, operation 904 is configured to determine a player score based on the player gaming metrics 204.

The method shown in FIG. 9 flows to operation 906 where the operation is configured to process the player score to qualify the player for access to one or more dynamic quests. For example, in one embodiment, the player score may be based on several factors such as achieving a task or an objective associated with the main story quests and dynamic quests, total number of kills, amount of currency, obtaining certain weapons, having a specific skill, damage taken, etc. At operation 908, the operation is configured to determine whether the player score meets the prerequisite condition of the dynamic quest. If the player score meets the prerequisite condition associated with the dynamic quest, the method flows to operation 910 where the operation is configured to access tables of predefined dynamic quests. If the player score does not meet the prerequisite condition associated with the dynamic quest, the method flows to operation 906 where the player scores continues to be processed based on the gameplay.

At operation 910, the operation is configured to configured to access tables of predefined dynamic quests. For example, referring to the predefined dynamic quests 236 table in FIG. 2D, operation 910 is configured to access the table and select the dynamic quests and corresponding dynamic quest sub-parts that the player may qualify for. In one example, the player 102 may qualify for a dynamic quest based on the player score. In other embodiments, the player 102 may qualify for a dynamic quest based on other prerequisites and conditions that are associated with the dynamic quest. The method shown in FIG. 9 flows to operation 912 where the operation is configured to present the dynamic quests to the player for selection by the player. In one embodiment, operation 912 is configured to insert the dynamic quest along the golden path at game regions where the player 102 may need assistance advancing in the gameplay. In other embodiments, operation 912 is configured to insert the dynamic quest before or after a main story quest.

Figure 10:
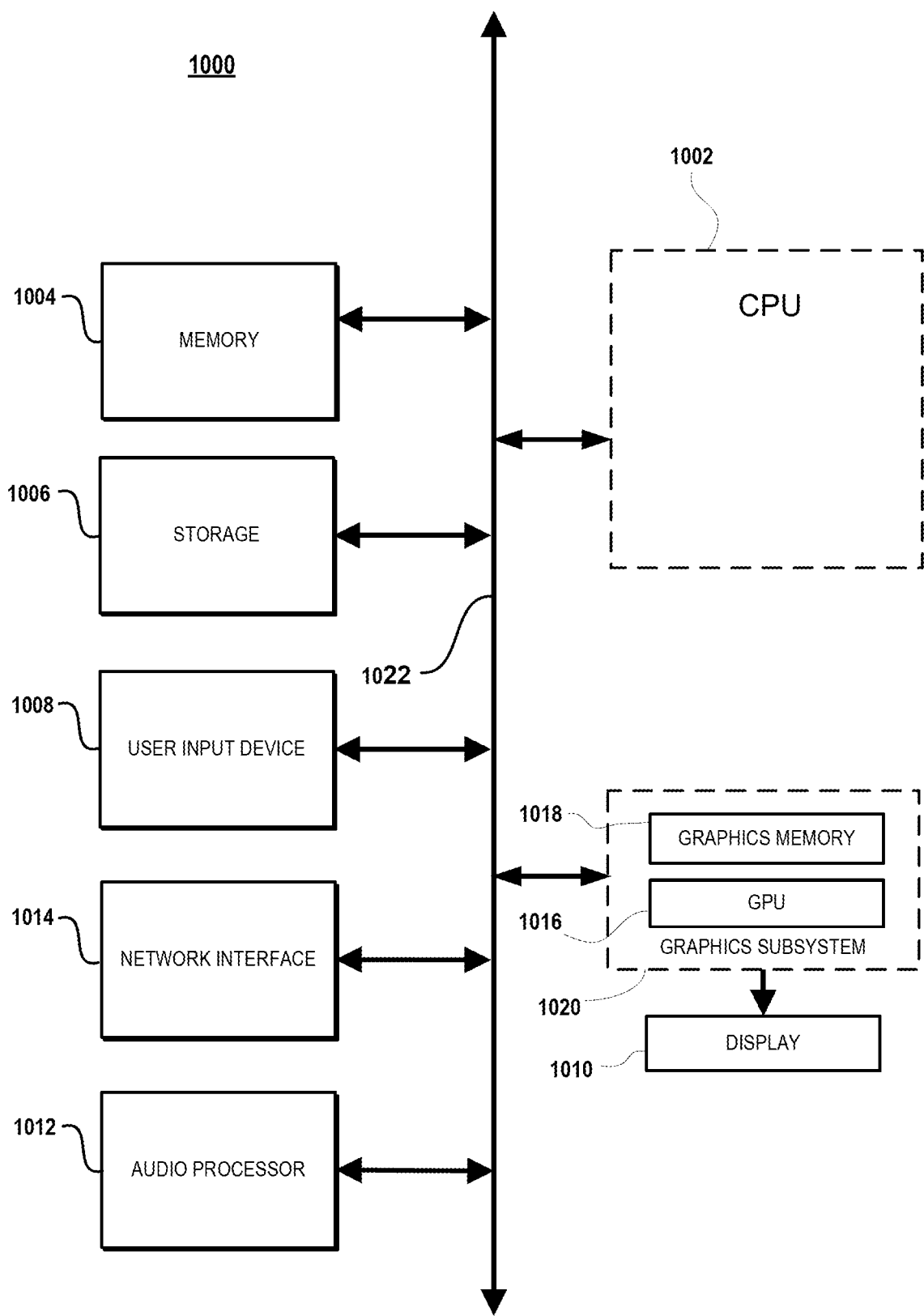
FIG. 10 illustrates components of an example device that can be used to perform aspects of the various embodiments of the present disclosure.

FIG. 10 illustrates components of an example device 1000 that can be used to perform aspects of the various embodiments of the present disclosure. This block diagram illustrates a device 1000 that can incorporate or can be a personal computer, video game console, personal digital assistant, a server or other digital device, suitable for practicing an embodiment of the disclosure. Device 1000 includes a central processing unit (CPU) 1002 for running software applications and optionally an operating system. CPU 1002 may be comprised of one or more homogeneous or heterogeneous processing cores. For example, CPU 1002 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 1000 may be a localized to a player playing a game segment (e.g., game console), or remote from the player (e.g., back-end server processor), or one of many servers using virtualization in a game cloud system for remote streaming of gameplay to clients.

Memory 1004 stores applications and data for use by the CPU 1002. Storage 1006 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1008 communicate user inputs from one or more users to device 1000, examples of which may include keyboards, mice, joysticks, touch pads, touch screens, still or video recorders/cameras, tracking devices for recognizing gestures, and/or microphones. Network interface 1014 allows device 1000 to communicate with other computer systems via an electronic communications network, and may include wired or wireless communication over local area networks and wide area networks such as the internet. An audio processor 1012 is adapted to generate analog or digital audio output from instructions and/or data provided by the CPU 1002, memory 1004, and/or storage 1006. The components of device 1000, including CPU 1002, memory 1004, data storage 1006, user input devices 1008, network interface 1010, and audio processor 1012 are connected via one or more data buses 1022.

A graphics subsystem 1020 is further connected with data bus 1022 and the components of the device 1000. The graphics subsystem 1020 includes a graphics processing unit (GPU) 1016 and graphics memory 1018. Graphics memory 1018 includes a display memory (e.g., a frame buffer) used for storing pixel data for each pixel of an output image. Graphics memory 1018 can be integrated in the same device as GPU 1008, connected as a separate device with GPU 1016, and/or implemented within memory 1004. Pixel data can be provided to graphics memory 1018 directly from the CPU 1002. Alternatively, CPU 1002 provides the GPU 1016 with data and/or instructions defining the desired output images, from which the GPU 1016 generates the pixel data of one or more output images. The data and/or instructions defining the desired output images can be stored in memory 1004 and/or graphics memory 1018. In an embodiment, the GPU 1016 includes 3D rendering capabilities for generating pixel data for output images from instructions and data defining the geometry, lighting, shading, texturing, motion, and/or camera parameters for a scene. The GPU 1016 can further include one or more programmable execution units capable of executing shader programs.

The graphics subsystem 1014 periodically outputs pixel data for an image from graphics memory 1018 to be displayed on display device 1010. Display device 1010 can be any device capable of displaying visual information in response to a signal from the device 1000, including CRT, LCD, plasma, and OLED displays. Device 1000 can provide the display device 1010 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for executing a video game, comprising:
   determining a golden path associated with a gameplay of a player, the golden path including a plurality of main story quests associated with the golden path;
   processing the gameplay to identify player gaming metrics as the player progresses along the golden path;
   examining the player gaming metrics to identify a game region along the golden path where the player is determined to need assistance to advance in the video game;
   generating a dynamic quest for the player, the dynamic quest is generated with one or more sub-parts to enable acquisition of a reward that assists the player to make advancement in said video game along the golden path; and inserting the dynamic quest along the golden path, the inserting presents the dynamic quest to the player and enables said acquisition of said reward.

2. The method of claim 1, wherein the dynamic quest is one of a plurality of dynamic quests that are generated and inserted along the golden path during gameplay of the video game, and wherein each of said dynamic quests that is inserted is based on game regions where the player is determined to need assistance to advance in the video game.

3. The method of claim 2, wherein each of said plurality of dynamic quests is inserted before or after one of said plurality of main story quests.

4. The method of claim 1, wherein the player gaming metrics include a plurality of game play conditions that are tracked while the player is playing the video game, and each of the plurality of game play conditions relate to a combination of game conditions and player interactivity conditions.

5. The method of claim 4, wherein each of the player gaming metrics is processed by a machine learning process that extracts features from said player gaming metrics and classifies the extracted features to form a gameplay model for the player in regard to the video game.

6. The method of claim 5, wherein generation of the dynamic quest is based on examination of the gameplay model and a plurality of training data rules.

7. The method of claim 6, wherein the plurality of training data rules include data for determining types of dynamic quests that provide assistance based on one or more of a current scenario of gameplay, a goal being attempted by the player, a level of success or failure being experienced by the player, a game asset needed by the player to advance, a detected level of engagement or disengagement by the player, a determined sentiment of the player, a failure to achieve a goal, a pre-requisite of achieving one or more tasks or goals, or a combination of two or more thereof.

8. The method of claim 7, wherein generation of the dynamic quest is based on examination of the gameplay model and the plurality of training data rules to determine if a pre-requisite associated with the dynamic quest is met by the player.

9. The method of claim 7, wherein the types of dynamic quests is a fetch type, a purchase type, a kill type, a destroy type, a sabotage type, a loot type, a build type, a messenger type, a defend type, a capture type, a puzzle type, an escape type, a search type, a steal type, a sneak type, a dialog type, a follow, a use type, or a combination of two or more thereof.

10. The method of claim 1, wherein the generating the dynamic quest for the player is further based on accessing the dynamic quest from tables of predefined dynamic quests based on the player gaming metrics.

11. The method of claim 1, the examining the player gaming metrics further identifies a player experience or player sentiment while the player is playing the video game.

12. The method of claim 1, wherein the inserting the dynamic quest along the golden path influences the player to move toward a certain direction in the video game.

13. The method of claim 1, wherein the inserting the dynamic quest along the golden path is spawned dynamically at a time during the gameplay that the player is determined to need the reward.

14. The method of claim 1, wherein the dynamic quest along the golden path that is not selected by the player for engagement is stored in a queue.

15. A method for executing a video game for a plurality of players, comprising:
    determining a plurality of golden paths associated with a gameplay of each of the plurality of players, the plurality of golden paths including a plurality of main story quests associated with the plurality of golden paths;
    processing the gameplay to identify player gaming metrics for the plurality of players as the plurality of players progresses along the plurality of golden paths associated with each of the plurality of players;
    examining the player gaming metrics for each of the plurality of players to identify game regions along the plurality of golden paths where the plurality of players are determined to need assistance advancing in the video game;
    generating a dynamic quest for each of the plurality of players, the dynamic quest is generated with one or more sub-parts to enable acquisition of a reward that assists the plurality of players advance in said video game; and
    presenting the dynamic quest along the plurality of golden paths of each of the plurality of players, the presenting presents the dynamic quest to the plurality of players and enables said acquisition of said reward.

16. The method of claim 15, wherein the inserting the dynamic quest along the plurality of golden paths influences the plurality of players to join with one another in an in-game meetup space, said in-game meetup space enables the plurality of players engage in an objective or task in the video game.

17. The method of claim 15, wherein the player gaming metrics for each of the plurality of players include a plurality of game play conditions associated with each of the plurality of players, each of the plurality of game play conditions relate to a combination of game conditions and player interactivity conditions of each of the plurality of players.

18. The method of claim 17, wherein the player gaming metrics for each of the plurality of players is processed by a machine learning process that extracts features from said player gaming metrics and classifies the extracted features to form a gameplay model for the plurality of players in regard to the video game.

19. The method of claim 18, wherein generating the dynamic quest for each of the plurality of players is based on examination of the gameplay model and a plurality of training data rules.

20. The method of claim 15, wherein the presenting the dynamic quest along the plurality of golden paths influences the plurality of players to move toward a certain direction in the video game.

* * * * *